US012655875B2

(12) United States Patent
Olason

(10) Patent No.: US 12,655,875 B2
(45) Date of Patent: *Jun. 16, 2026

(54) OFF-ROAD RECREATIONAL VEHICLE

(71) Applicant: Arctic Cat Inc., Thief River Falls, MN (US)

(72) Inventor: Kyle Douglas Olason, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/887,640

(22) Filed: Sep. 17, 2024

(65) Prior Publication Data

US 2025/0012328 A1     Jan. 9, 2025

Related U.S. Application Data

(63) Continuation of application No. 18/497,377, filed on Oct. 30, 2023, now Pat. No. 12,117,048, which is a
(Continued)

(51) Int. Cl.
| | |
|---|---|
| *F16D 3/223* | (2011.01) |
| *B62D 23/00* | (2006.01) |
| *B60K 17/34* | (2006.01) |

(52) U.S. Cl.
CPC .......... *F16D 3/223* (2013.01); *B62D 23/005* (2013.01); *B60G 2200/1322* (2013.01);
(Continued)

(58) Field of Classification Search
CPC . F16D 3/205; F16D 3/223; F16D 3/06; F16D 2003/22323
See application file for complete search history.

(56) References Cited

U.S. PATENT DOCUMENTS

| | | | |
|---|---|---|---|
| 2,474,360 A | 6/1949 | Jimerson | |
| 3,460,644 A | 8/1969 | Porsche et al. | |

(Continued)

FOREIGN PATENT DOCUMENTS

| | | |
|---|---|---|
| CN | 103057392 A | 4/2013 |
| CN | 113074192 A | 7/2021 |

(Continued)

OTHER PUBLICATIONS

Dakar 2013: preparation of participants Robby Gordon, Nasser Al-Attiyah and Gerard De Rooy. Article showing Dakar Hummer; Oct. 19, 2012.
(Continued)

*Primary Examiner* — James A English
(74) *Attorney, Agent, or Firm* — Billion & Armitage

(57) ABSTRACT
Embodiments relate to an off-road vehicle comprising a frame, including at a frame, a passenger compartment, a driveline that includes at least a drive system and a driven system, and a constant velocity (CV) joint for coupling the driven system to the drive system. The CV joint includes a housing, a coupling shaft, a detent, a plunge pin and an actuation pin, wherein the actuation pin has a first end that is accessible via an aperture in the housing, wherein actuation of the actuation pin determines whether the plunge pin is in the first position or the second position.

20 Claims, 26 Drawing Sheets

Related U.S. Application Data continuation of application No. 17/339,370, filed on Jun. 4, 2021, now Pat. No. 11,802,593, which is a continuation of application No. 16/102,135, filed on Aug. 13, 2018, now Pat. No. 11,028,883, which is a continuation-in-part of application No. 15/811,011, filed on Nov. 13, 2017, now abandoned.

(52) U.S. Cl.
CPC .. *B60G 2200/144* (2013.01); *B60G 2200/422* (2013.01); *B60G 2300/07* (2013.01); *B60K 17/34* (2013.01); *F16D 2003/22313* (2013.01)

(56) References Cited

U.S. PATENT DOCUMENTS

| | | | |
|---|---|---|---|
| 3,608,936 | A | 9/1971 | Karden |
| 4,103,514 | A | 8/1978 | Grosse-Entrup |
| 4,177,654 | A | 12/1979 | Aucktor |
| 4,223,758 | A | 9/1980 | Schopf |
| 4,254,639 | A | 3/1981 | Teramachi |
| 4,705,491 | A | 11/1987 | Andersson |
| 4,884,399 | A | 12/1989 | Morris |
| 5,026,325 | A | 6/1991 | Welschof |
| 5,036,939 | A | 8/1991 | Johnson et al. |
| 5,611,733 | A | 3/1997 | Jacob et al. |
| 5,624,318 | A | 4/1997 | Jacob et al. |
| 5,725,453 | A | 3/1998 | Zalewski et al. |
| 5,836,599 | A | 11/1998 | Rein |
| 5,855,386 | A | 1/1999 | Atkins |
| 6,112,843 | A | 9/2000 | Wilcox et al. |
| 6,145,416 | A | 11/2000 | Bonniot |
| 6,217,456 | B1 | 4/2001 | Jacob |
| 6,234,908 | B1 | 5/2001 | Jacob |
| 6,254,487 | B1 | 7/2001 | Jacob |
| 6,306,045 | B1 | 10/2001 | Jacob |
| 6,390,928 | B1 | 5/2002 | Welschof et al. |
| 6,422,369 | B1 | 7/2002 | Mccalla |
| 6,585,602 | B2 | 7/2003 | Cermak et al. |
| 6,851,691 | B2 | 2/2005 | Rasidescu et al. |
| 6,874,392 | B1 | 4/2005 | Wu |
| 6,902,487 | B2 | 6/2005 | Welschof |
| 7,018,317 | B2 | 3/2006 | Tweet |
| 7,229,358 | B2 | 6/2007 | Carlini et al. |
| 7,281,984 | B2 | 10/2007 | Foster-Hamilton et al. |
| 7,363,999 | B2 | 4/2008 | Hastings |
| 7,488,257 | B1 | 2/2009 | Booker et al. |
| 7,510,199 | B2 | 3/2009 | Nash et al. |
| 7,670,229 | B2 | 3/2010 | Disser et al. |
| 7,673,719 | B2 | 3/2010 | Buschena |
| 7,753,801 | B2 | 7/2010 | Umekida et al. |
| 7,762,894 | B2 | 7/2010 | Momiyama et al. |
| 7,905,540 | B2 | 3/2011 | Kiley et al. |
| 8,070,611 | B2 | 12/2011 | Wormsbaecher et al. |
| 8,083,245 | B2 | 12/2011 | Hatzikakidis |
| 8,118,683 | B2 | 2/2012 | Disser et al. |
| 8,328,649 | B2 | 12/2012 | Disser |
| 8,388,457 | B2 | 3/2013 | Keller |
| 8,523,209 | B2 | 9/2013 | Pollmeyer et al. |
| 8,573,337 | B1 | 11/2013 | Luoma et al. |
| 8,649,950 | B2 | 2/2014 | Yang |
| 8,746,394 | B2 | 6/2014 | Kuramoto et al. |
| 8,746,719 | B2 | 6/2014 | Safranski et al. |
| 8,764,039 | B2 | 7/2014 | Keller |
| 8,870,667 | B2 | 10/2014 | Buth et al. |
| 9,381,785 | B2 | 7/2016 | Gale |
| 9,493,185 | B2 | 11/2016 | Dada et al. |
| 9,623,909 | B1 | 4/2017 | Hirano |
| 9,623,912 | B2 | 4/2017 | Schlangen |
| 10,036,428 | B2 | 7/2018 | Doner et al. |
| 10,124,659 | B2 | 11/2018 | Bessho et al. |
| 10,160,497 | B2 | 12/2018 | Wimpfheimer et al. |
| 10,196,094 | B2 | 2/2019 | Tsumiyama et al. |
| 10,280,683 | B1 | 5/2019 | Smid |
| 10,350,952 | B2 | 7/2019 | Gordon et al. |
| 10,358,029 | B2 | 7/2019 | Gruschow et al. |
| 2002/0166603 | A1 | 11/2002 | Camacho |
| 2002/0177485 | A1 | 11/2002 | Cermak et al. |
| 2003/0090128 | A1 | 5/2003 | Seksaria et al. |
| 2004/0216942 | A1 | 11/2004 | Tanaka et al. |
| 2005/0124420 | A1 | 6/2005 | Kuczera et al. |
| 2006/0012145 | A1 | 1/2006 | Gardner |
| 2006/0189396 | A1 | 8/2006 | Kozlowski et al. |
| 2007/0024044 | A1 | 2/2007 | Ogawa |
| 2008/0248886 | A1 | 10/2008 | Disser et al. |
| 2010/0143075 | A1 | 6/2010 | Disser |
| 2010/0326761 | A1 | 12/2010 | Melcher |
| 2011/0109052 | A1 | 5/2011 | Hatzikakidis |
| 2011/0127135 | A1 | 6/2011 | Grogg et al. |
| 2012/0031688 | A1 | 2/2012 | Safranski |
| 2012/0031693 | A1 | 2/2012 | Deckard et al. |
| 2012/0055729 | A1 | 3/2012 | Bessho |
| 2012/0063842 | A1 | 3/2012 | Keller |
| 2012/0223500 | A1 | 9/2012 | Kinsman |
| 2013/0033070 | A1 | 2/2013 | Kinsman et al. |
| 2013/0197756 | A1 | 8/2013 | Ramirez Ruiz |
| 2013/0277937 | A1 | 10/2013 | Keller et al. |
| 2013/0319785 | A1 | 12/2013 | Spindler |
| 2014/0103627 | A1 | 4/2014 | Deckard et al. |
| 2014/0124279 | A1 | 5/2014 | Schlangen et al. |
| 2014/0183327 | A1 | 7/2014 | Takahashi et al. |
| 2014/0262584 | A1 | 9/2014 | Lovold et al. |
| 2014/0345964 | A1 | 11/2014 | Nakaoka et al. |
| 2015/0061275 | A1 | 3/2015 | Deckard |
| 2015/0094158 | A1 | 4/2015 | Mondragon et al. |
| 2015/0137481 | A1 | 5/2015 | Manternach et al. |
| 2015/0292371 | A1 | 10/2015 | Barnes |
| 2016/0176287 | A1 | 6/2016 | Ripley et al. |
| 2016/0257360 | A1 | 9/2016 | Mackenzie |
| 2016/0347137 | A1 | 12/2016 | Despres-Nadeau et al. |
| 2017/0001549 | A1 | 1/2017 | Bessho |
| 2017/0029036 | A1 | 2/2017 | Proulx et al. |
| 2017/0050483 | A1 | 2/2017 | Gordon |
| 2017/0050517 | A1 | 2/2017 | Higuchi |
| 2017/0050673 | A1 | 2/2017 | Gordon |
| 2017/0122377 | A1 | 5/2017 | Fukuzawa et al. |
| 2017/0174027 | A1 | 6/2017 | Mailhot et al. |
| 2017/0248169 | A1 | 8/2017 | Gordon |
| 2017/0292570 | A1 | 10/2017 | Ketchel et al. |
| 2018/0058821 | A1 | 3/2018 | Kwiatkowski et al. |
| 2018/0201249 | A1 | 7/2018 | Belloso |
| 2018/0326846 | A1 | 11/2018 | Soto Velasco |
| 2020/0248750 | A1 | 8/2020 | Gordon |
| 2021/0001667 | A1 | 1/2021 | Davis |
| 2021/0108683 | A1 | 4/2021 | Oh |
| 2023/0111825 | A1 | 4/2023 | Yoo et al. |
| 2024/0227941 | A1 | 7/2024 | Rasa et al. |
| 2025/0092918 | A1* | 3/2025 | Poojari ................. F16D 3/2237 |

FOREIGN PATENT DOCUMENTS

| | | |
|---|---|---|
| DE | 4230529 A1 | 3/1994 |
| DE | 102006016843 A1 | 10/2007 |
| EP | 1081023 A1 | 3/2001 |
| WO | 9002634 A1 | 3/1990 |
| WO | 2014059258 A1 | 4/2014 |

OTHER PUBLICATIONS

Image Off-Road Vehicle, http:www.race-dezert.com/forum/threads/extreme-baja-karts.37384; Dec. 23, 2007.
*Speed RMG Partners, LLC*, Robby Gordon, and Todd Romano, Plaintiffs, v. *Arctic Cat Sales Inc., Arctic Cat Inc., Textron Specialized Vehicles Inc.*, and *Textron Inc.*, Defendants. File No. 20-cv-609, Jury Trial Proceedings—vol. VIII, Dec. 14, 2022.
"1400HP Buckshot Racing sand car build Member Rides & Builds Show off your whip, Show off your System! SMD Forum", retrieved May 4, 2016 from http://www.stevemeadedesigns.com/board/topic/1375431400hpbuckshotracingsandcarbuild/.
"Checkmate: Speed UTV Live Presentation No. 108", Speed UTV, Retrieved Apr. 5, 2023 from https://www.youtube.com/watch?v=2tjmuXp9Tw4.

(56) References Cited

OTHER PUBLICATIONS

"Deposition of Michael J. Mckeen, Feb. 16, 2021", *Speed RMG Partners* vs *Arctic Cat Sales Inc.*, Case No. 0:20-cv-00609-SRN-LIB, United States District Court for the District of Minnesota.

"Monster Energy Buckshot Racing Sandrail At the Orange County Sand Show", YouTube Video, https://www.youtube.com/watch?v=UfroFVLVw; Published Sep. 15, 2012.

"Notice of Allowance for application No. 3,051,317 mailed on May 21, 2024", 1 Page.

"Office Action Received for Application No. 3051317 Mailed on Dec. 27, 2023", 4 Pages.

"RCV Ultimate UTV Axle for Polaris IP900 Front ('11-'14)", Aug. 20, 2015, 1-2.

"RG Pro—Arctic Cat brochure".

"U.S. Appl. No. 14/498,216 PTO File History".

"Universal Joint and Driveshaft Design Manual, AE-7, Society of Automotive Engineers", Inc., Warrendale, PA, pp. 311-319, TJ1079.S62. (Year: 1979), 311-319.

Bertrand, Blanquet , "Front structure of a motor car and motor car equipped with this structure", EPO, EP 1 081 023 A1, Machine Translation of Description, Mar. 7, 2001, 8 pages.

Brandel , et al., "Car with exchangeable rear engine—Has rear engine and wheels mounted in detachable subframe plugging into car shell and fixed by vertical bolts", EPO, DE 4 230 529 A1, Machine Translation of Description, Mar. 17, 1994, 5 pages.

Fu , et al., "An engine suspension assembly", PE2E database, CN 103057392 A, Machine Translation of Description, Apr. 24, 2013, 6 pages.

Gordon , et al., "Universal Wishbone Trailing Arm—Specification", Aug. 21, 2015, USPTO, U.S. Appl. No. 62/208,531, 2015.

Gordon , et al., "Universal Wishbone Trailing Arm—Drawings", Aug. 21, 2015, USPTO, U.S. Appl. No. 62/208,531.

* cited by examiner

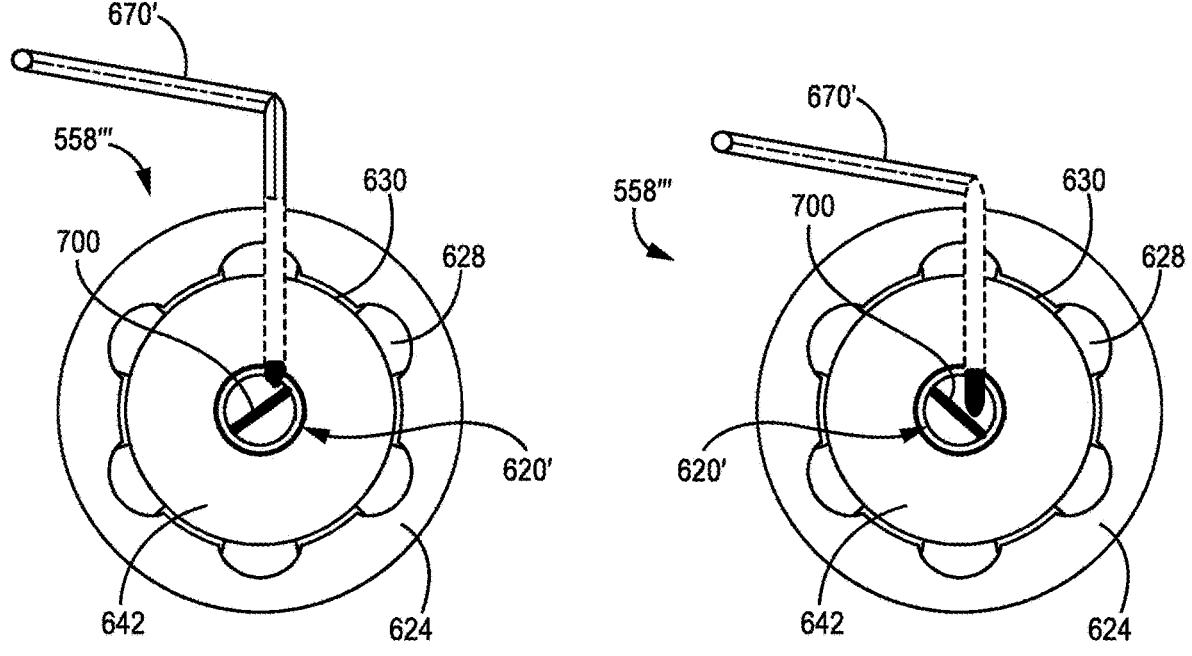
FIG. 21A          FIG. 21B

OFF-ROAD RECREATIONAL VEHICLE

CROSS-REFERENCE TO RELATED APPLICATIONS

This application is a continuation of U.S. application Ser. No. 18/497,377, filed Oct. 30, 2023, which is a continuation of U.S. application Ser. No. 17/339,370, filed Jun. 4, 2021, now U.S. Pat. No. 11,802,593, which is a continuation of U.S. application Ser. No. 16/102,135, filed on Aug. 13, 2018, now U.S. Pat. No. 11,028,883, which is a continuation-in-part of U.S. application Ser. No. 15/811,011, filed Nov. 13, 2017 and titled "Off-Road Recreational Vehicle", the contents of which are incorporated by reference in their entirety.

BACKGROUND

Off-road recreational vehicles, such as side-by-side recreational off-highway vehicles ("ROVs") or all-terrain vehicles ("ATVs"), are quite capable in a wide variety of riding environments and situations, whether for sport or utility purposes. The vehicles can be easy to enter and exit and easy to operate with controls and ergonomics somewhat similar to automobiles. However, unlike most automobiles, off-road recreational vehicles can be driven on harsh off-road terrain.

SUMMARY

According to some embodiments, an off-road vehicle includes a frame, a passenger compartment, a driveline, and a constant velocity (CV) joint. The driveline includes at least a drive system and a driven system. The CV-joint is coupled to provide power from the drive system to the driven system, and includes a housing, a coupling shaft, a detent, and a plunge pin. The housing includes a first end for engaging a driven shaft and a second end opposite the first end. The coupling shaft is located at the second end of the housing and is configured for engagement with the drive system. The detent extends to an outer periphery of the coupling shaft and is configured to maintain engagement between the coupling shaft and the drive system. The plunge pin is disposed at least partially within the coupling shaft and movable relative thereto, the plunge pin having a first position that maintains the detent in an engaged position with the drive system and a second position in which the plunge pin is moved away from the first end of the housing to permit disengagement of the detent with the drive system. The actuation pin is located adjacent to the plunge pin and extends in a direction non-parallel to the plunge pin, wherein the actuation pin has a first end that is accessible via an aperture in the housing, wherein actuation of the actuation pin determines whether the plunge pin is in the first position or the second position.

In some embodiments, a constant velocity (CV) joint includes a housing, a coupling shaft, a detent, a plunge pin and an actuation pin. The housing has a first end for engaging a driven shaft and a second end opposite the first end. The coupling shaft is located at the second end of the housing, wherein the coupling shaft is configured for engagement with a drive system. The detent extends to an outer periphery of the coupling shaft and is configured to maintain engagement between the coupling shaft and the drive system during operation. The plunge pin is disposed at least partially within the coupling shaft and movable relative thereto, wherein the plunge pin has a first position that maintains the detent in an engaged position with the drive system and a second position in which the plunge pin is moved away from the first end of the housing to permit disengagement of the detent with the drive system. The actuation pin is located adjacent to the plunge pin and extends in a direction non-parallel to the plunge pin. The actuation pin has a first end that is accessible via an aperture in the housing, wherein actuation of the actuation pin determines whether the plunge pin is in the first position or the second position.

According to some embodiments, a constant velocity (CV) joint assembly includes a CV housing, a plunge pin, and an actuation pin. The CV housing has a radially extending aperture and coupling shaft extending from the housing, the coupling shaft defining a hollow portion therein. The plunge pin extends within at least a portion of the hollow portion of the coupling shaft, wherein the plunge pin has a first configuration and a second configuration in which the plunge pin is axially offset from the first configuration. The actuation pin extends within the aperture, the actuation pin having a recessed portion, wherein at least a portion of the plunge pin is in contact with the actuation pin in both the first and second configurations and, in the first or second configuration at least a portion of the plunge pin is in contact with the recessed portion.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 21A-21B are end views of the CV joint in an operational state and a non-operational state according to some embodiments.

DETAILED DESCRIPTION

In some embodiments, a utility vehicle, such as a recreational off-highway utility vehicle is shown. The contents of U.S. application Ser. No. 15/811,011, filed Nov. 13, 2017; titled "OFF-ROAD UTILITY VEHICLE"; are herein incorporated by reference.

Figure 1:
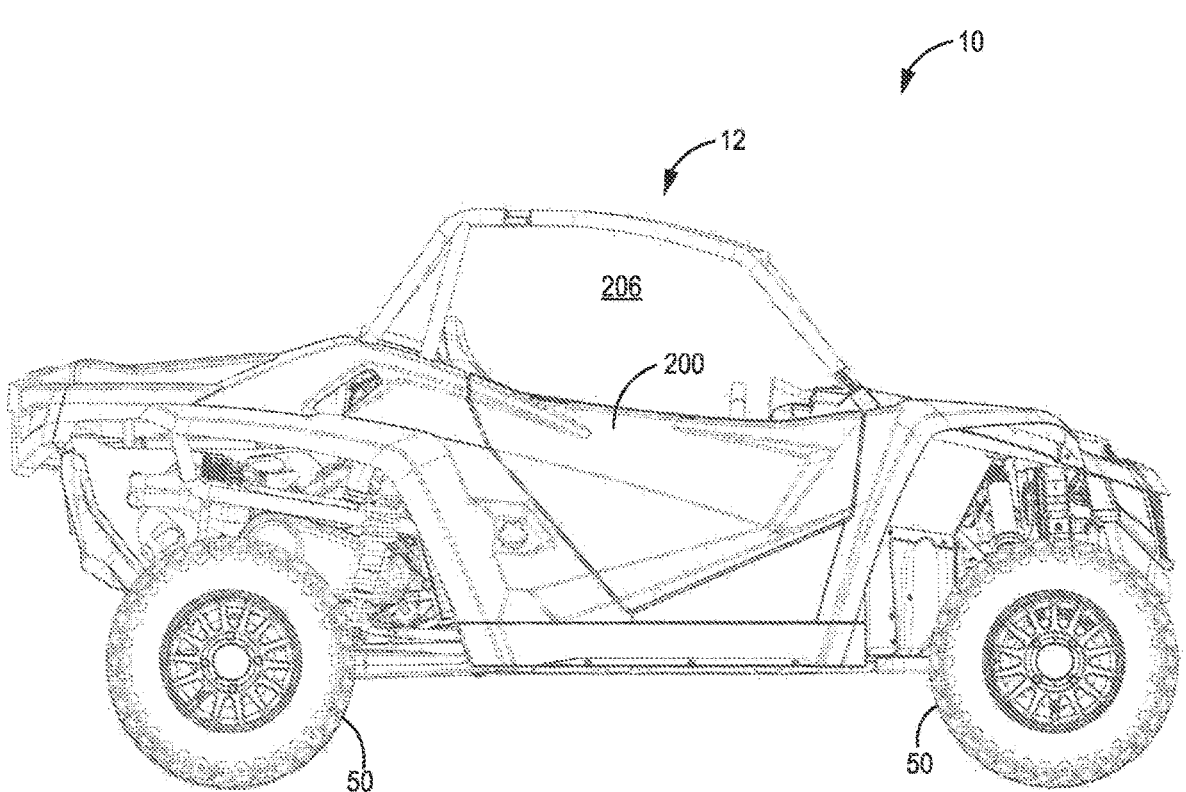
FIG. 1 is a side view of an off-road recreational vehicle, according to some embodiments.
Figure 2:
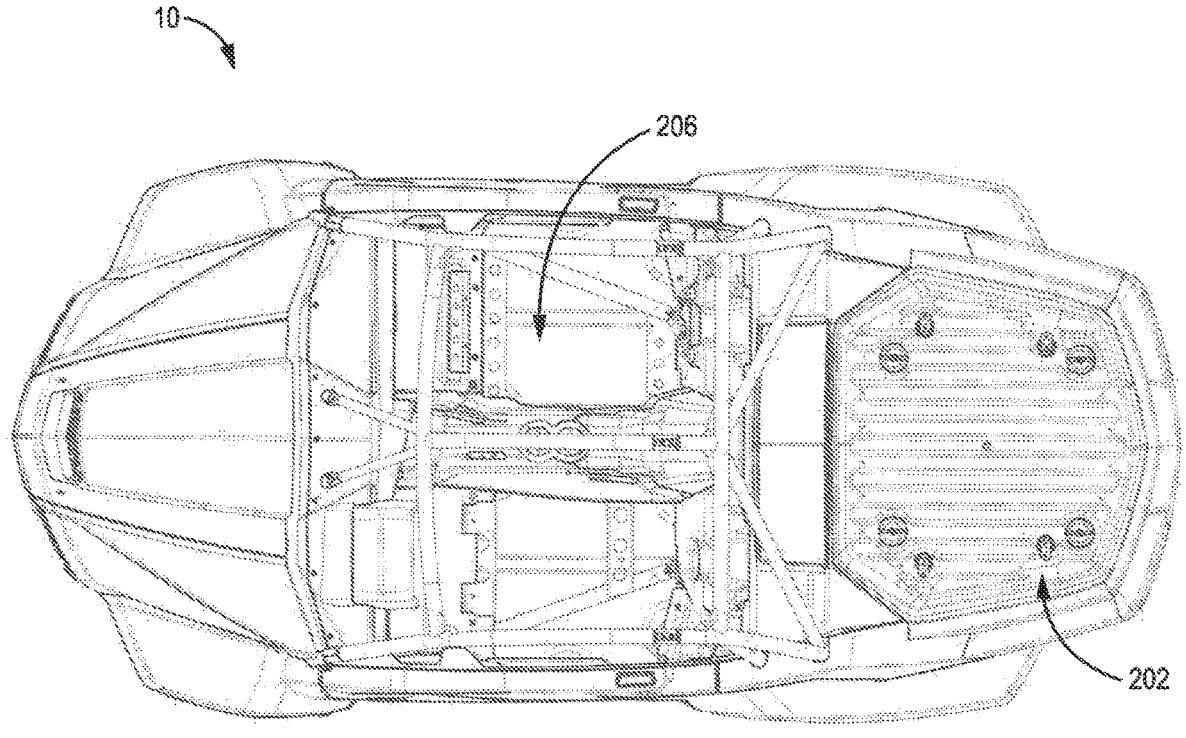
FIG. 2 is a top view of an off-road recreational vehicle, according to some embodiments.

As shown in FIG. 1 an embodiment of an off-road vehicle 10 includes a plurality of ground engaging members 50, a front suspension assembly 72 (FIG. 4), a rear suspension assembly 38 (FIG. 4), a frame 12, and one or more body panels 200. In some embodiments, the off-road vehicle 10 further comprises a cargo box 202 (FIG. 2).

In some embodiments, the frame 12 includes a ROPS (roll-over protection structure) 210 and a main frame 212. In some embodiments, the ROPS 210 is attached to the main frame 212. As used in herein, the term "frame" 12 includes both the ROPS 210 and main frame 212. In some embodiments, main frame 212 and/or ROPS 210 are comprised of structural members 204 (FIG. 3) which are coupled together (e.g., welded, bolted, glued). Further, the structural members 204 can be tubular steel or aluminum, stamped sheet metal (e.g., steel, aluminum), hydroformed, cast, forged, or formed in any other suitable manner. The off-road vehicle 10 can be 2-wheel or 4-wheel drive. Further, it can have any suitable style of drive system. In some embodiments, the off-road vehicle 10 is 4-wheel drive and includes a differential one or both the front end and rear end of the off-road vehicle 10. The differentials can include optional locking differentials or they can be open differentials, which can be manually selectable by an operator or engaged automatically in response to terrain conditions (e.g., wheel slip). In some embodiments, the off-road vehicle has a limited slip differential (e.g., clutch pack, Quaife, Torsen) or any other suitable configuration (e.g., spool).

Figure 3:
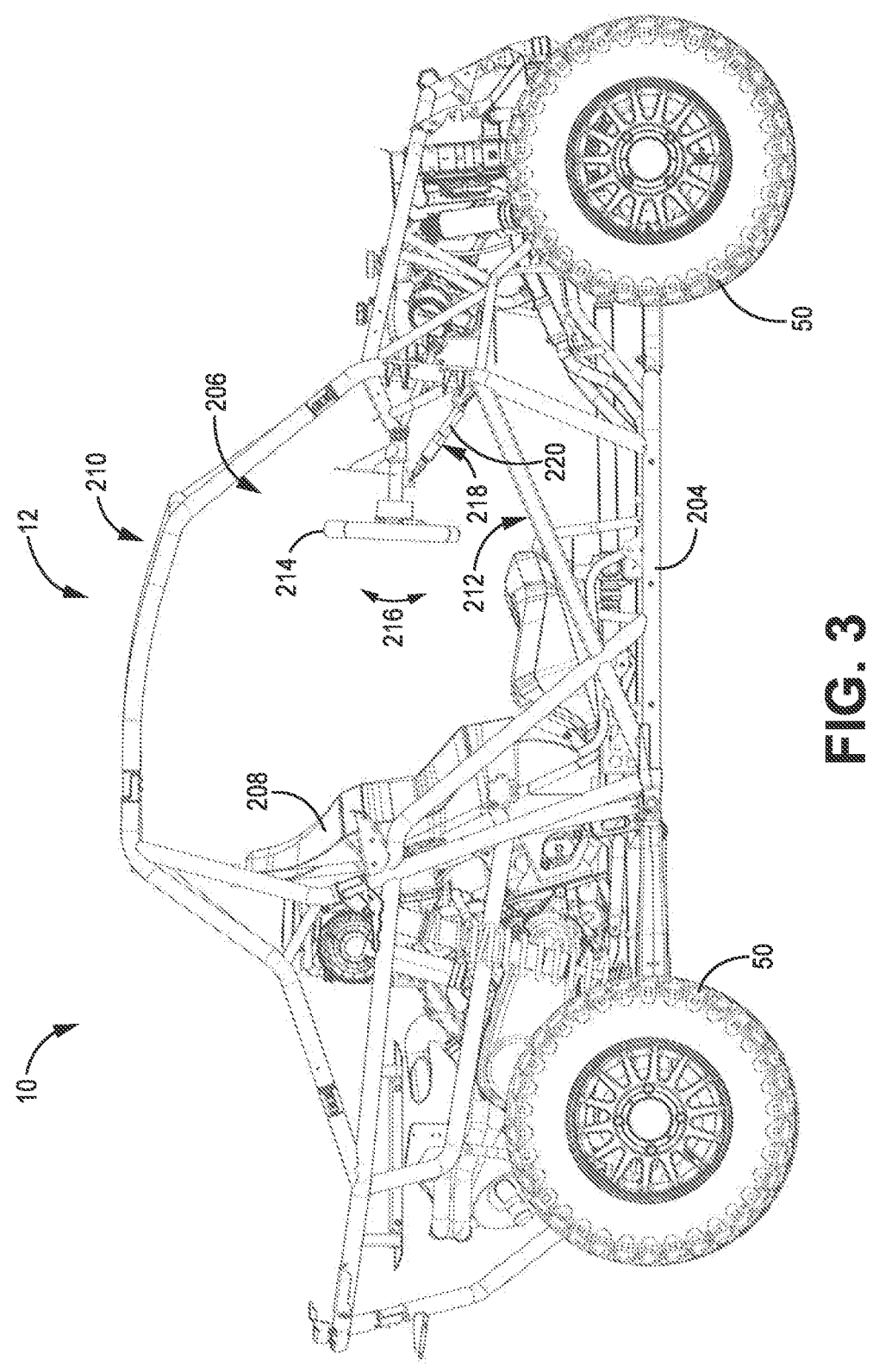
FIG. 3 is a side view of an off-road recreational vehicle, with body panels removed to illustrate various components, according to some embodiments.

With further regard to FIG. 3, in some embodiments, the off-road vehicle 10 includes a seating area 206. The seating area 206 includes one or more seats 208. Further one or more of the seats 208 can be arranged in any configuration, such as a side-by-side configuration. Further still, the seats 208 can include bench seats, bucket seats, or a combination of both bench and bucket seating. In some embodiments, one or more of the seats 208, or portions thereof, are adjustable.

As shown in FIG. 3, in some embodiments, the off-road vehicle 10 includes a steering wheel 214 which is coupled, for example via a steering linkage, to at least two of the ground engaging members 50, for example front ground engaging members. The steering wheel 214 is coupled to the front ground engaging members 50 (e.g., tires) in any suitable way, for example by mechanical steering linkage, electric power steering (EPS), hydraulically assisted power steering, electric power steering without mechanical linkage (e.g., drive-by-wire), electric assisted power steering ((EPAS), e.g., including pull-drift compensation, active nibble control, etc.) or in any other suitable way. Further, in some embodiments, the steering can include variable ratio steering and it can be programmable such that the user can set the steering ratio (and rate-of-change of steering ration, if it is variable) to illicit a steering response in accordance with the user's or manufacturer's desires (e.g., exhibiting understeer characteristics). As further shown in FIG. 3, in some embodiments, the steering wheel 214 tilts, shown via arrow 216. In some embodiments, tilt assembly 218 allows steering wheel 214 to be tilted as shown.

Figure 4:
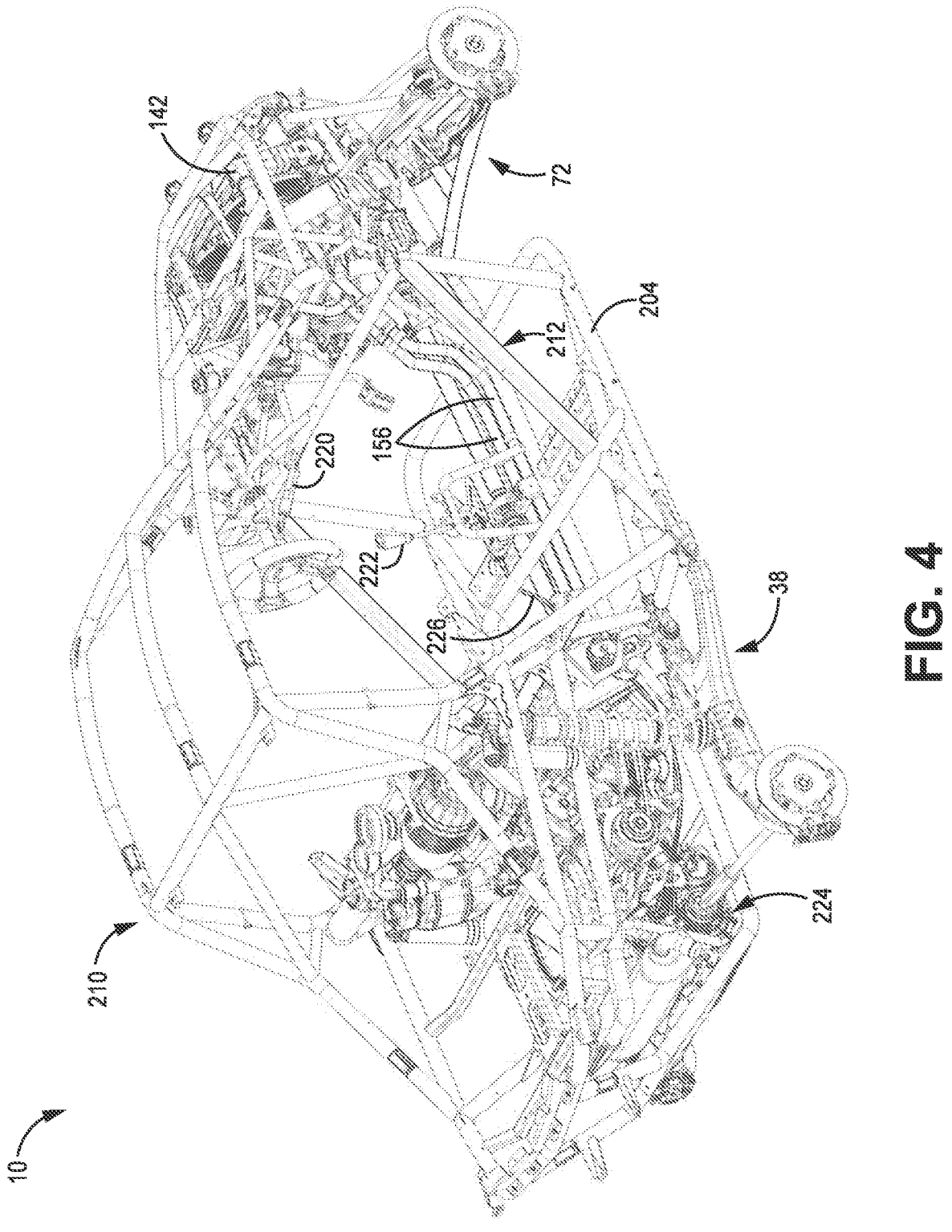
FIG. 4 is a rear perspective view of an off-road recreational vehicle, with body panels removed to illustrate components of the frame and driveline, according to some embodiments.

With regard to FIG. 4, the off-road vehicle 10 includes a gear shift selector 222. The gear shift selector 222 is coupled to the transmission/transaxle 224, for example via a push-pull cable 226. The off-road vehicle 10 further includes a radiator 142 and coolant lines (or coolant hoses) 156.

Figure 5:
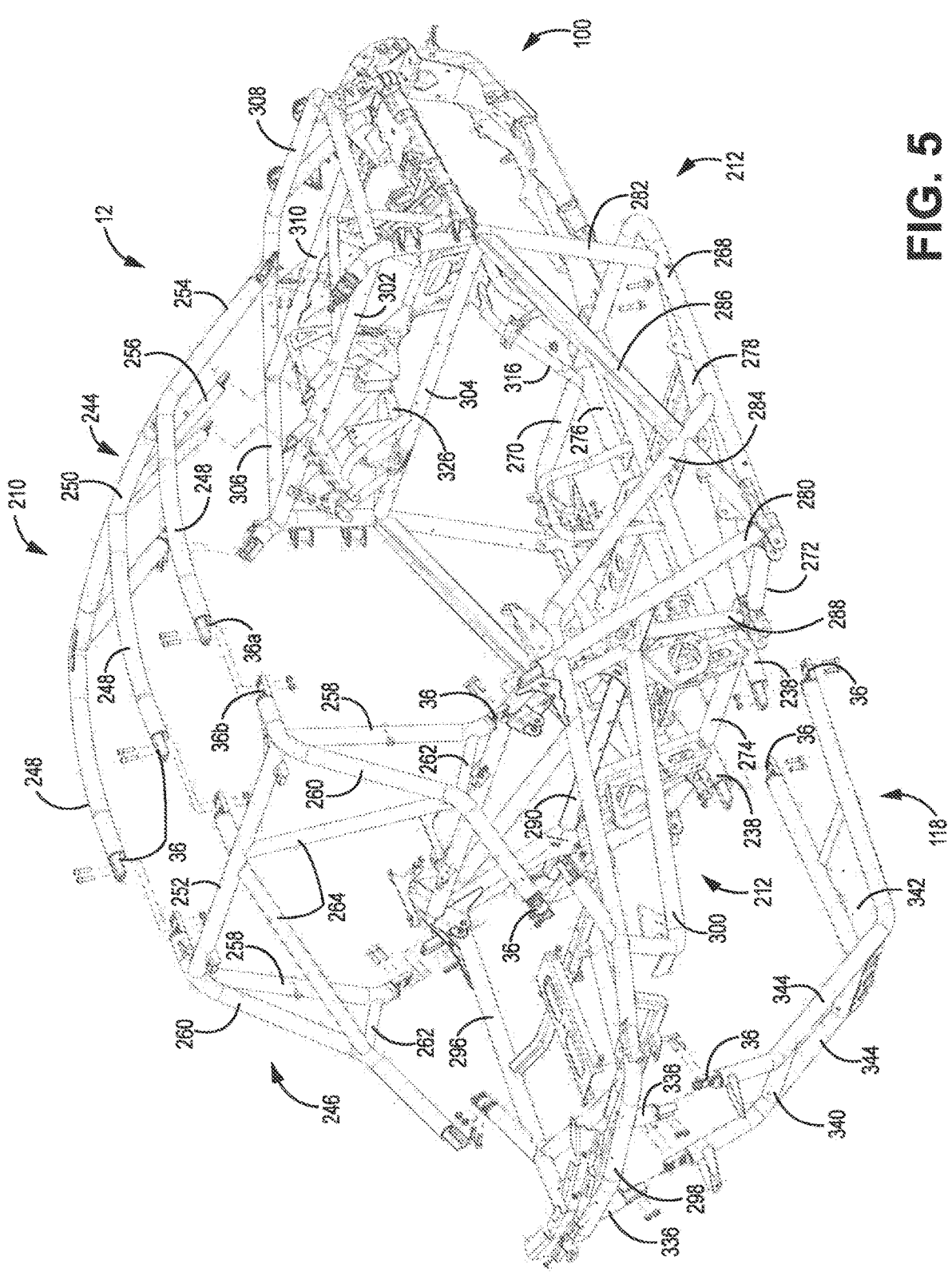
FIG. 5 is a rear perspective view of an off-road recreational vehicle, with body panels removed to illustrate connection of frame components to one another, according to some embodiments.
Figure 6:
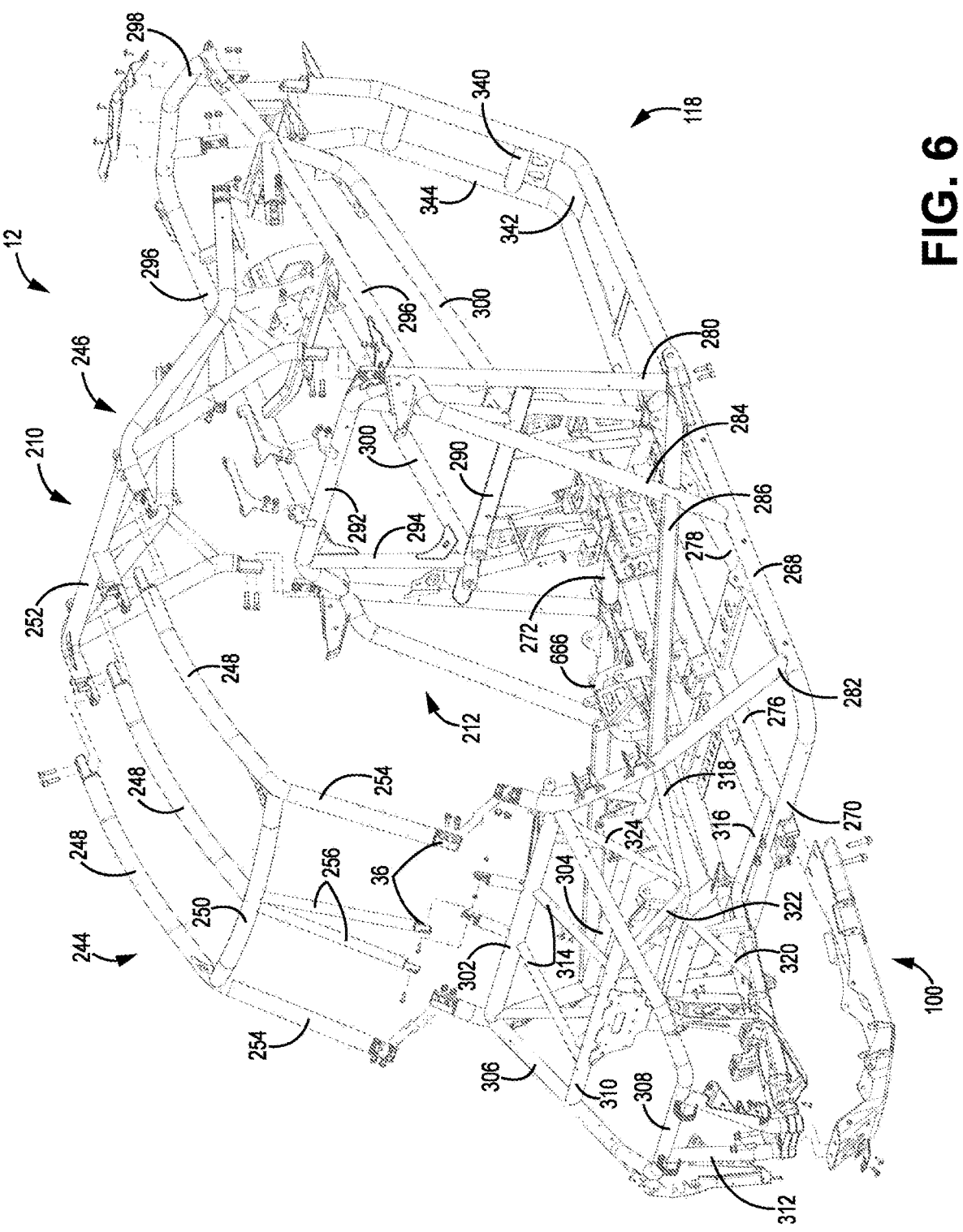
FIG. 6 is a front perspective view of an off-road recreational vehicle, with body panels removed to illustrate connection of frame components to one another, according to some embodiments.

With regard to FIGS. 5 and 6, in some embodiments, the ROPS 210 comprises two detachable portions: a first detachable ROPS portion 244 and a second detachable ROPS portion 246. In some embodiments, the second detachable ROPS portion 246 is rearward of the first detachable ROPS portion 244. In some embodiments, the first and second detachable ROPS portions 244, 246 are coupled to one another via one or more disconnects 36. In some embodiments, the disconnects 36 comprise castings that mate with opposing disconnects. As shown in FIG. 5, for example, disconnect 36*a* is configured to mate with disconnect 36*b*.

In some embodiments, the ROPS 210 includes one or more lengthwise ROPS members 248. In some embodiments, the ROPS 210 includes three lengthwise ROPS members 248 which are generally parallel to one another. In some embodiments, one or more of the lengthwise ROPS members 248 are bowed outwardly. As shown in FIG. 5, in some embodiments, the ROPS 210 further includes a front transverse ROPS member 250 and a rear transverse ROPS member 252. In some embodiments, one or both of the front transverse ROPS member 250 and a rear transverse ROPS member 252 are bowed. As shown in FIG. 5, in some embodiments, the front transverse ROPS member 250 is bowed forwardly such that the middle of the front transverse ROPS member 250 is forward of the left and right ends of the front transverse ROPS member 250.

In some embodiments, the ROPS 210 includes an A-pillar member 254. In some embodiments, the A-pillar member 254 is formed form the same piece of tubing as a lengthwise ROPS member 248. In some embodiments, the ROPS 210 includes front V-brace members 256. In some embodiments, the front V-brace members 256 are coupled to the front transverse ROPS member 250, for example via welding. In some embodiments, the front V-brace members 256 are further comprise disconnects and are removably coupled to mating disconnects. In some embodiments, the front V-brace members 256 have a smaller diameter than the diameter of the A-pillar member(s) 254.

In some embodiments, the ROPS 210 includes an intermediate pillar member 258 and a rear pillar member 260, as shown for example in FIG. 5. In some embodiment, the intermediate pillar member 258 and rear pillar member 260 are coupled via a pillar bracing member 262. In some embodiments, one or both of the intermediate pillar member 258 and rear pillar member 260 include disconnects 36 such that the second detachable ROPS portion 246 can be removed from the main frame 212.

In some embodiments, the ROPS 210 includes rear V-brace members 264 (FIG. 5). In some embodiments, the rear V-brace members 264 are coupled (e.g., welded) to rear pillar members 260 and rear transverse ROPS member 250. In some embodiments, the ROPS 210 includes one or more gussets to add strength to ROPS 210. In some embodiments, the gussets are welded to adjacent ROPS members.

In some embodiments, for example as shown in FIGS. 5 and 6, the main frame 212 includes outer lower frame member(s) 268, front lateral lower frame member(s) 270, rear outer lateral lower frame member(s) 272, rear inner lateral lower frame member 274, inner lower frame member(s) 276, joining lower frame member(s) 278, rear outer upstanding support member(s) 280, front outer upstanding support member(s) 282, intermediate outer upstanding support member(s) 284, diagonal outer support member(s) 286, rear inner upstanding lower support member(s) 288, rear intermediate lateral frame member 290, rear upper lateral frame member 292, rear inner upstanding intermediate support member(s) 294, rear outer lengthwise frame member(s) 296, rear outer lateral frame member(s) 298, rear inner lengthwise frame member(s) 300, upper lateral dash support member 302, lower lateral dash support member 304, front upper lengthwise frame member(s) 306, front upper lateral frame member 308, front upper intermediate lateral frame member 310, front upstanding frame member(s) 312, upper lengthwise dash support member(s) 314, front lengthwise bridging member(s) 316, front intermediate support member(s) 318, front intermediate bridging member(s) 320, front upper bridging member(s) 322, front intermediate dash support member 324, steering support member 326.

In some embodiments, the frame 12 includes a removable front subframe 100 (FIG. 6). In some embodiments, the removable front subframe 100 is coupled (e.g., via fasteners such as bolts) to the front lateral lower frame member 270 via lower front subframe casting. The lower front subframe casting 328 is coupled to the front lateral lower frame member 270, for example, via welding.

With further regard to FIGS. 5 and 6, in some embodiments, the frame 12 includes a removable rear subframe 118. In some embodiments, the rear subframe 118 includes disconnects 36 which couple the rear subframe 118 to the rear outer lateral frame member 298, for example via tube segments 336 extending downwardly from the rear outer lateral frame member 298. In some embodiments, the rear subframe 118 is further coupled to the rear inner lateral lower frame member 274, for example via lengthwise tube segments 338. In some embodiments, the rear subframe 118 comprises one or more laterally extending tube connection members 340. In some embodiments, the rear subframe 118 includes one or more rear subframe panels 342 (e.g., stampings), as shown in FIGS. 5 and 6, to join adjacent rear subframe members 344.

Figure 7:
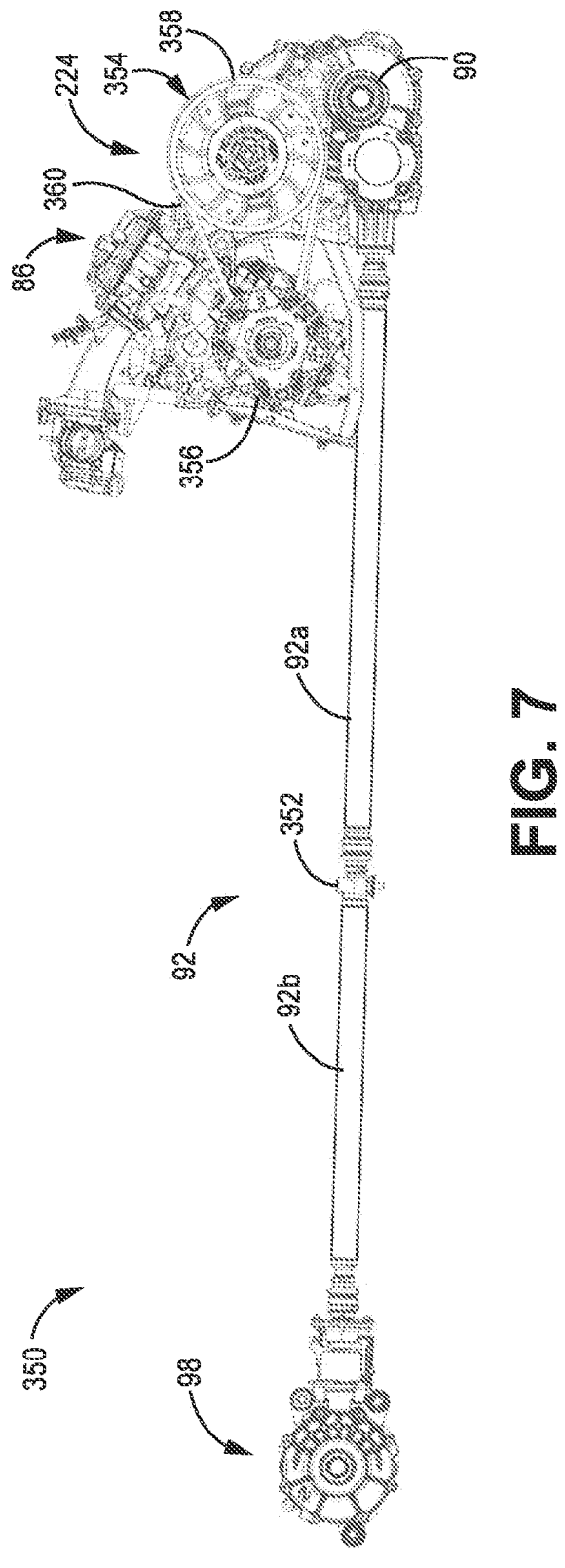
FIG. 7 is a side view of a driveline utilized in the off-road recreational vehicle according to some embodiments
Figure 8:
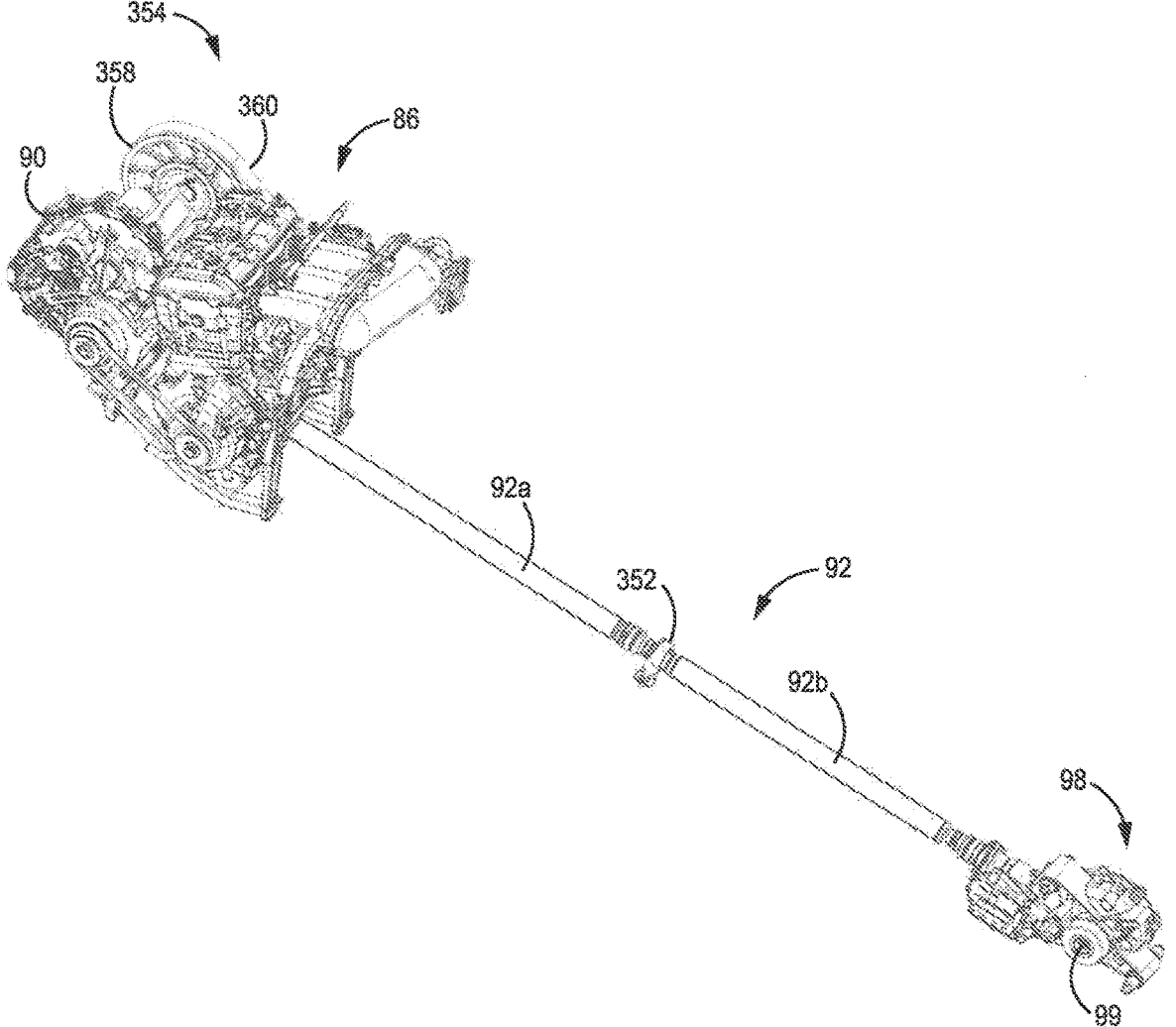
FIG. 8 is a perspective view of a driveline utilized in the off-road recreational vehicle according to some embodiments

As shown for example in FIGS. 7 and 8, the off-road vehicle 10 includes a driveline 350. Referring to FIGS. 7 and 8, in some embodiments, the off-road vehicle 10 includes a longitudinally extending driveshaft 92. In some embodiments, the driveshaft 92 is a two-piece driveshaft, for example having a first section 92*a* and a second section 92*b*, as shown in FIGS. 7 and 8, however, it can also be a single piece driveshaft, three piece driveshaft, etc. Where a two-piece driveshaft 92 is utilized, a bearing mount 352, including a bearing such as a ball bearing, can be located at the joint between the first section 92*a* and the second section 92*b*. Further, the bearing mount 352 can be used to secure the driveshaft 92 to the frame 12, while permitting rotation of the driveshaft 92. In some embodiments, one or more portions of the driveshaft 92 extend beneath a portion of the engine 86, as shown in FIG. 7.

In some embodiments, the driveshaft 92 is selectively coupled to a front differential 98. In some embodiments, the front differential 98 can include a locker, for example as disclosed in U.S. Pat. No. 7,018,317, the contents of which are herein incorporated by reference.

As further shown in FIGS. 7 and 8, in some embodiments, transmission/transaxle 224 (shown in FIG. 4) includes a continuously variable transmission ("CVT") 354, which in turn includes a drive clutch 356 and a driven clutch 358. The drive clutch 356 and driven clutch 358 have a belt 360 extending therebetween. In some embodiments, the driven clutch 358 is coupled to a transaxle 90. In some embodiments, the transaxle 90 has: one or more forward gears, one or more reverse gears, and neutral. Further, in some embodiments, the transaxle 90 has a park setting. Each of the gear settings can be selected by an operator, for example via gear shift selector 222 (FIG. 4). As discussed in more detail below, transaxle 90 may be coupled to first and second rear half-shafts, wherein the rear half-shafts transmit power from transaxle 90 to rear ground-engaging member 50. Similarly, front differential 98 may be coupled to first and second front half-shafts, wherein the front half-shafts transmit power from front differential 98 to front ground-engaging member 50. For purposes of this description, transaxle 90 and front differential 98 may be generically referred to as "drive systems", while rear half-shafts and front half-shafts connected thereto may be generically referred to as "driven systems".

Figure 9:
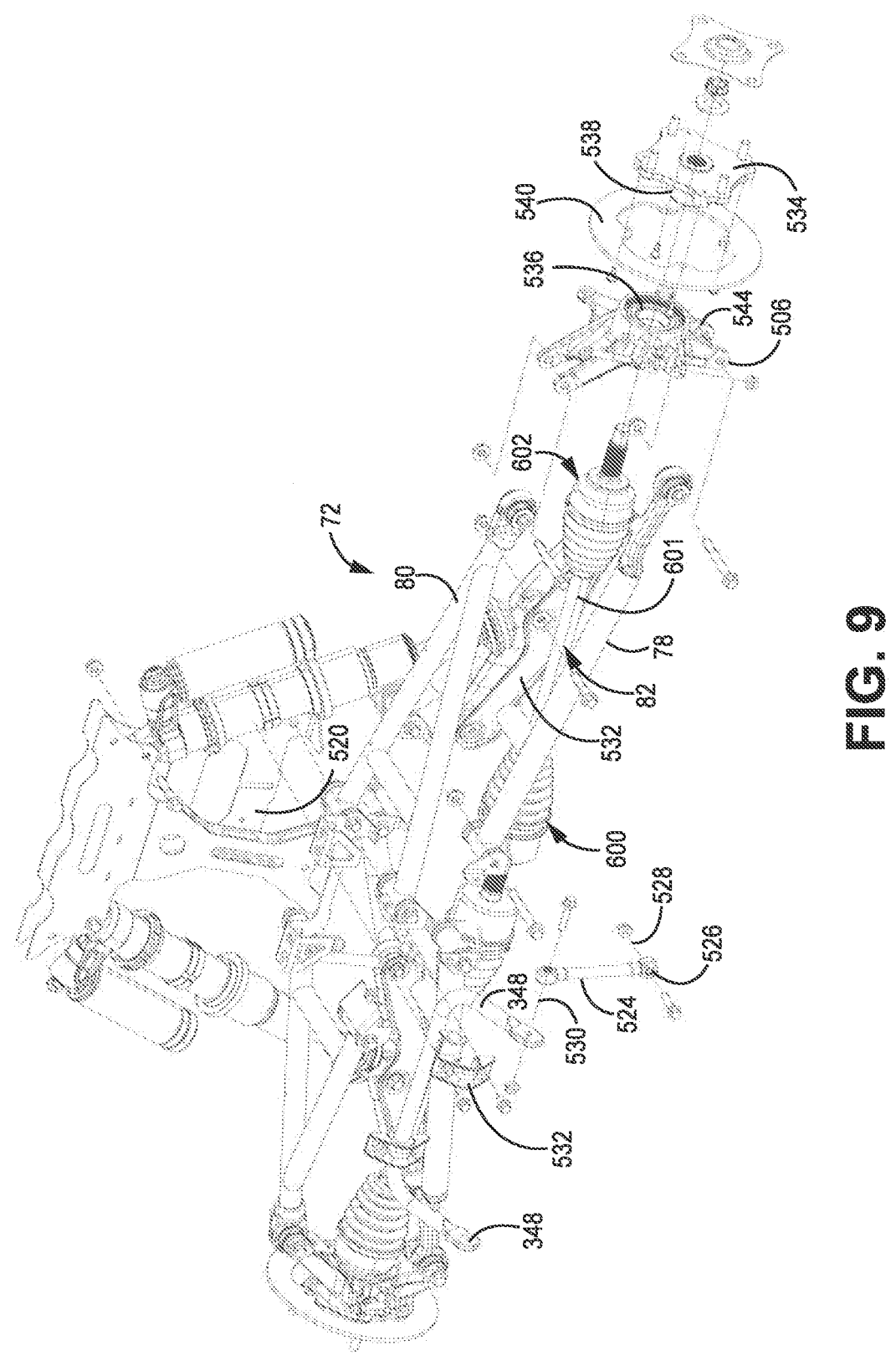
FIG. 9 is an exploded view illustrating front suspension and front half-shafts according to some embodiments

Referring now to FIG. 9, a perspective view of a front suspension assembly 72 is shown, which includes upper A-arms 80, lower A-arms 78, and front anti-roll bar (ARB) 348. In some embodiments, the upper A-arms 80 are movably coupled to the front upper A-arm support member 330, for example via upper A-arm mount(s) 346. In some embodiments, the front anti-roll bar 348 is coupled to the lower A-arms 78. In some embodiments, the front anti-roll bar 348 is rotatably coupled to front ARB support member 520, via front ARB hangar(s) 522. In some embodiments, the lower A-arms 78 are coupled to the anti-roll bar 348 via front ARB links 524. In some embodiments, the front ARB links 524 include spherical joints 526 at one or both ends thereof, as shown in FIG. 9, for example. As also shown in FIG. 9, in some embodiments, the spherical joints 526 each have a nominal axis (528, 530) though which a fastener is inserted. In some embodiments, the nominal axes 528 and 530 are non-parallel and, in some embodiments, are perpendicular to one another. In some embodiments, for example as shown in FIG. 9, the front ARB links 524 are coupled to a central support 532 which extends intermediate the forward and rearward arms of the lower A-arm 78.

With regard to FIG. 9, a front half-shaft assembly 82 includes inner constant velocity (CV) joint 600 and outer CV joint 602. In this embodiment, the front half-shaft 82 delivers power from the front differential 98 (shown in FIGS. 7 and 8) to the wheel hub 534 and associated ground-engaging members 50. In particular, inner CV joint 600 and outer CV joint 602 allow for movement of ground-engaging members 50 relative to front differential 98 during suspension movement and further allow the front knuckle 506 to turn for steering the vehicle.

For various reasons such as, but not limited to, maintenance, inspection, or damage, it may be necessary to remove and replace front half-shaft 82 from front differential 98. To accommodate easy removal, some embodiments rely on a plunge pin assembly described in more detail with respect to FIGS. 11A-20D, below. In general, the plunge pin assembly includes a plunge pin accessible to an operator that allows for easy actuation of the plunge pin to disengage coupling between the two components, such as between the front half-shaft 510 from the front differential 98. In other embodiments, plunge pin assembly may be utilized to disengage other coupled components, such as outer CV joint 602 from wheel hub 534. Generally, the plunge pin assembly is utilized to decouple/disengage a driven system from a drive system.

In the embodiment shown in FIG. 9, external splines on the outward end of front half-shaft 82 interact with internal splines on the wheel hub 534 to thereby drive the wheel hub 534. In addition, external splines on the inward end of front half-shaft 82 interact with internal splines 99 on the front differential 98 (shown in FIG. 8), such that front half-shaft 82 is driven by front differential 98. In the embodiment shown in FIG. 9, CV joint 600 is utilized to allow articulation of driven shaft 601—located between inner CV joint 600 and outer CV joint 602—relative to front differential 98 while maintaining constant rotational velocity between them. Likewise, front half-shaft 82 is coupled to wheel hub

534 via CV joint 602. In some embodiments, a front knuckle 506 includes an bearing 536; an inner portion 538 of the wheel hub 534 rides on the bearing 536. In some embodiments, a brake rotor 540 is coupled to the wheel hub 534 inwardly of the flange portions of wheel hub 534.

In some embodiments, inner CV joint 600 is affixed to front differential 98 by a detent and a plunge pin assembly, discussed in more detail below. In some embodiments, outer CV joint 602 is affixed to wheel hub 534 by a detent and a plunge pin assembly. In some embodiments, the inner (or outer) CV joint 600 is detached from the front differential 98 (or wheel hub 534) by axially moving or plunging the plunge pin to release the detent assembly, allowing the CV joint (more broadly, the driven system) to be removed. It is beneficial to provide an easily accessible mechanism for mechanically plunging the plunge pin to allow the joint assembly to be easily removed, as described in more detail below with respect to FIGS. 11A to 20D.

Referring now to FIGS. 10A-10D, a rear drive/suspension system is shown which includes transaxle 90, rear half-shaft 550, rear suspension 552, and wheel 554. Transaxle 90 is configured to be coupled to rear half-shaft 550, wherein transaxle provides mechanical power to rear half-shaft 550 that is communicated to wheel 554. In this embodiment, transaxle 90 represents a drive system and rear half-shaft 550 and wheel 554 represents a driven system.

Figure 10A:
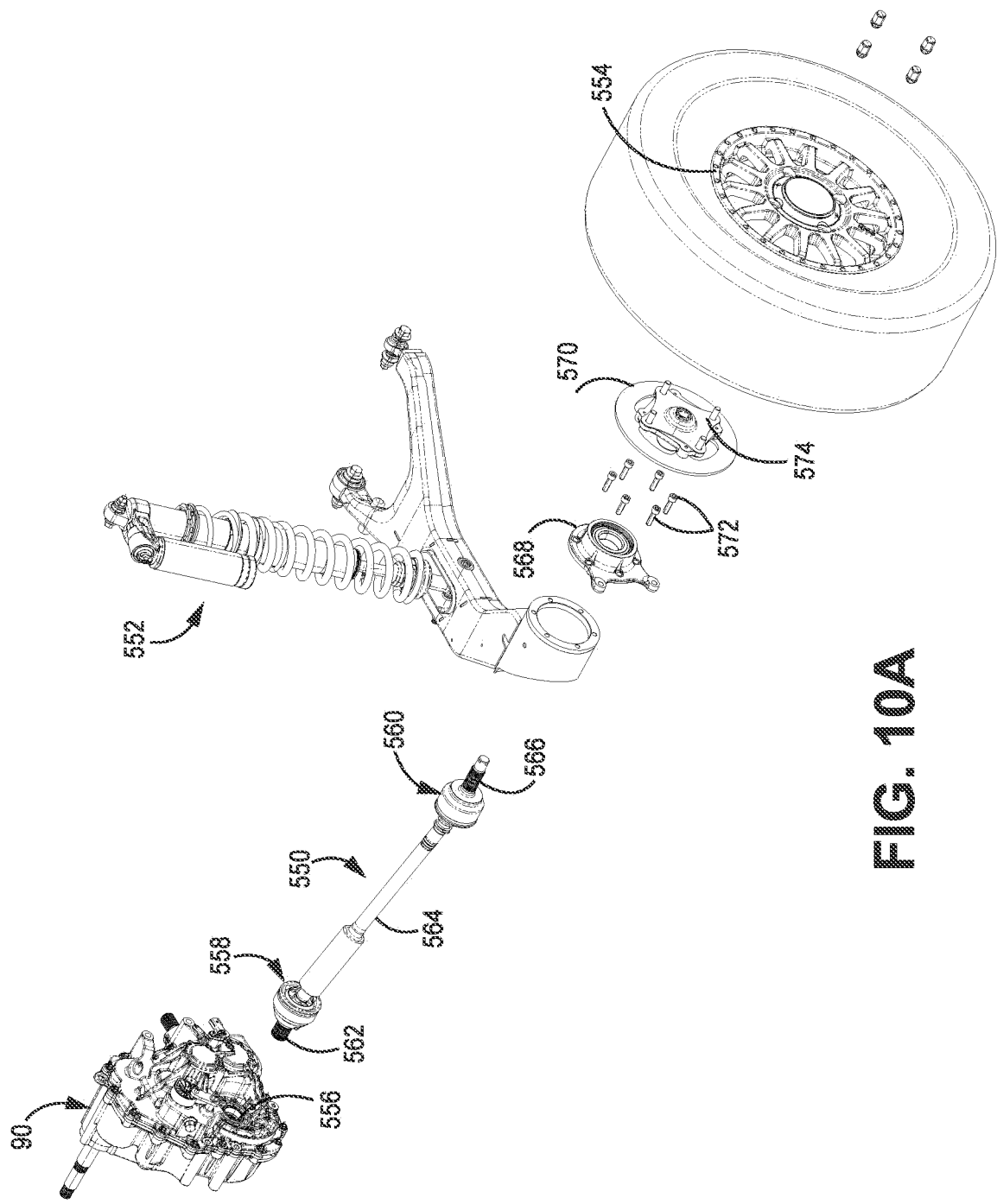
FIG. 10A is an exploded view illustrating the coupling of the rear half-shaft with the rear transaxle according to some embodiments

In some embodiments, rear half-shaft 550 includes inner and outer constant velocity (CV) joints 558 and 560, respectively. Boot covers included over CV joints 558 and 560 have been removed in this view. In the embodiment shown in FIG. 10A, external splines on the inner end of rear half-shaft 550—referred to herein as coupling shaft 562—interact with internal splines 556 on the transaxle 90. Similarly, external splines located on the outer end of rear half-shaft 550—referred to herein as coupling shaft 566—interact with internal splines (not shown) on wheel hub 574 to thereby drive the wheel hub 574 and wheel 554. In the embodiment shown in FIG. 10A, transaxle 90 is coupled to rear half-shaft 550 via CV joint 558. Likewise, as shown in the embodiment of FIG. 10A, rear half-shaft 550 is coupled to wheel hub 574 via CV joint 560. In some embodiments, a brake rotor 570 is coupled to the wheel hub 574 inwardly of the flange portions of wheel hub 574.

Figure 10B:
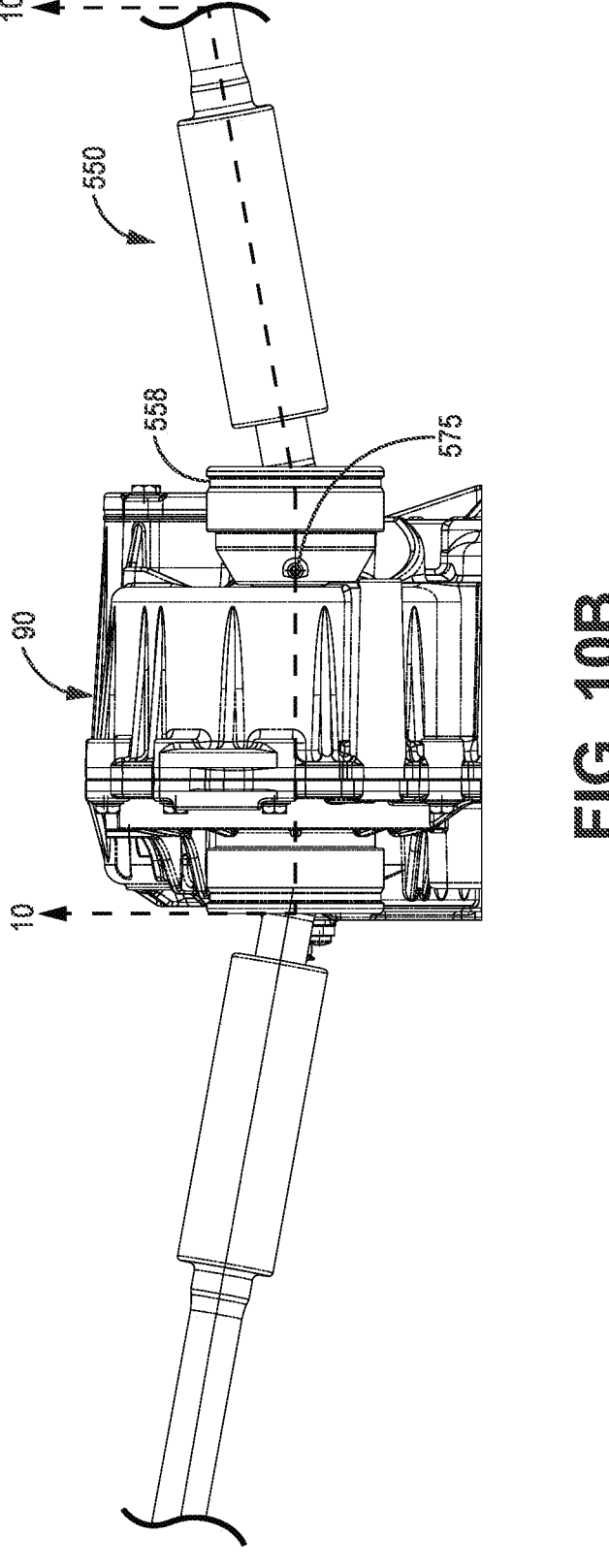
FIG. 10B is a top view illustrating the coupling of the rear half-shaft with the rear transaxle according to some embodiments.

In some embodiments, inner CV joint 558 is affixed to transaxle 90 by a detent and a plunge pin assembly, discussed in more detail below. As shown in FIG. 10B, an aperture/opening 575 provided on CV joint 558 provides an easily accessible means for activating the plunge pin and releasing the detent, allowing the rear half-shaft 550 to be de-coupled or disengaged from transaxle 90. One or more of the CV joints 600 and 602 shown in FIG. 9 may include an aperture similar to aperture 575 shown in FIG. 10B. In some embodiments, outer CV joint 560 is affixed to wheel hub 574 by a detent and a plunge pin assembly which, in some embodiments, includes a similar aperture in CV joint 560 to that shown in FIG. 10B. In some embodiments, the inner (or outer) CV joint 558 is detached from the rear transaxle 90 (or wheel hub 574) by axially moving or plunging the plunge pin to release the detent assembly, allowing the CV joint (more broadly, the driven system) to be removed.

Figure 10C:
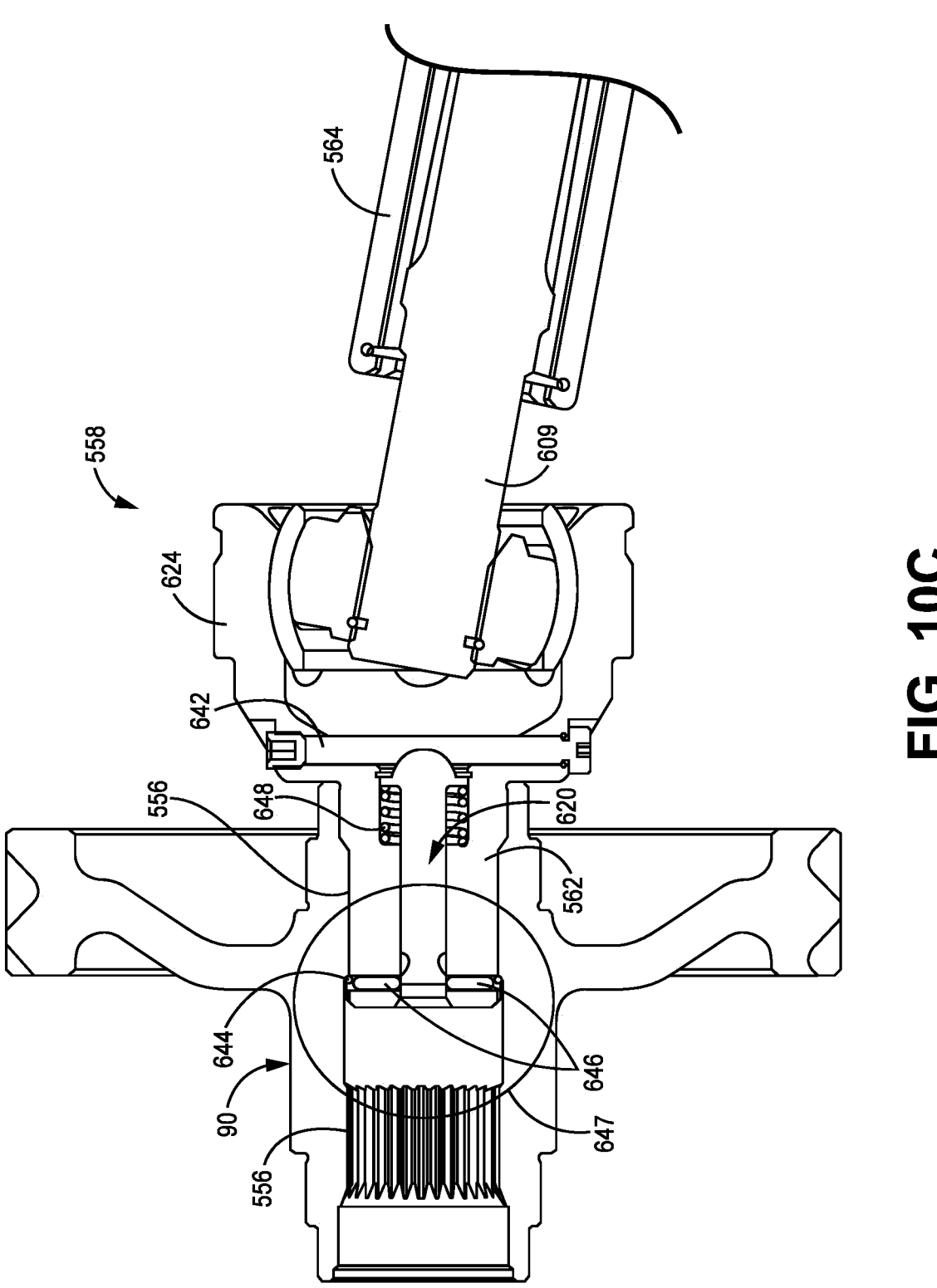
FIG. 10C is a cross-sectional view illustrating the rear half-shaft coupled to rear transaxle taken along line 10-10 shown in FIG. 10B according to some embodiments.

FIG. 10C is a cross-sectional view of the inner CV joint 558 attached to the transaxle 90 taken along line 10-10 shown in FIG. 10B. In order to show the interior of the spool, the CV joint shown on the left-hand side of FIG. 10B is not shown in FIG. 10C. Inner CV joint 558 includes coupling shaft 562 having external splines that interact or couple with internal or female splines 556 included in transaxle 90 (as shown in FIG. 10A). For example, in the embodiment shown in FIGS. 10C and 10D, internal spline 556 associated with the CV joint on the left-hand side of FIG. 10B is shown, while internal spline 556 associated with right-hand side CV joint 558 is identified in FIG. 10C by the change (decrease) in inner radius indicative of the internal spline 556.

Figure 10D:
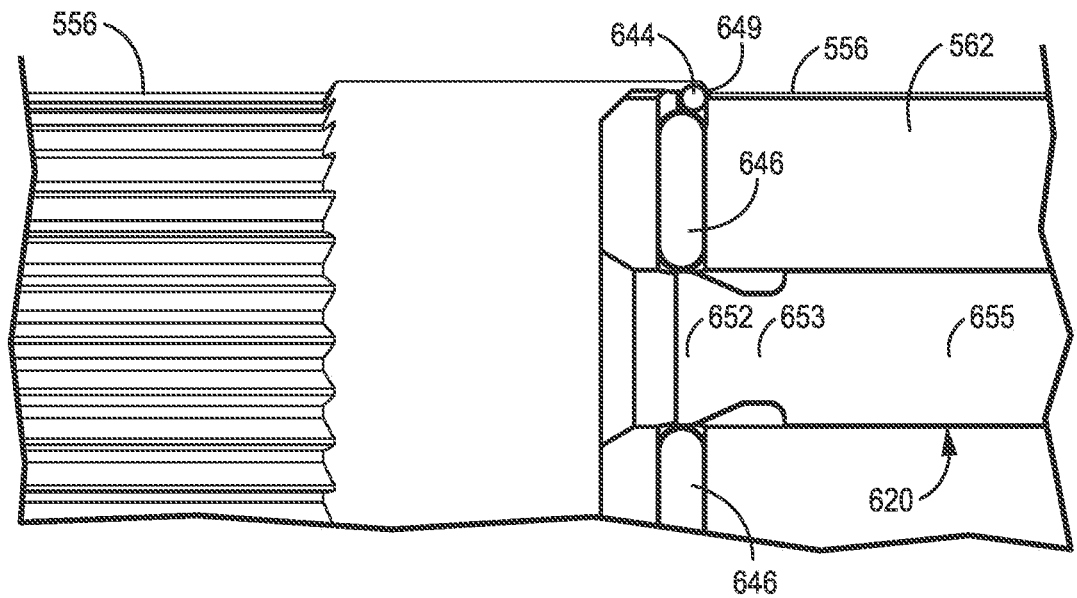
FIG. 10D is a magnified view of a portion of FIG. 10C according to some embodiments.

FIG. 10D is a magnified view of the region within circle 647 as shown in FIG. 10C. As shown in FIGS. 10C and 10D, coupling shaft 562 is retained axially by first retaining device 644, which may take the form of a circlip, a snap ring, a coil spring, or a crest wave spring. First retaining device 644 may be implemented using either an internal retaining device or an external retaining device, each of which is described below. During operation, the first retaining device 644 prevents lateral (i.e., axial) movement of coupling shaft 562 due to engagement of the first retaining device 644 with shoulder 649 of internal spline 556. In some embodiments, shoulder 649 is defined by a change in cylindrical radius from an outer radius to an inner radius. In some embodiments, the change in radius defines a ramp or inclination between the inner radius and the outer radius, rather than an abrupt change. When plunge pin 620 is uncompressed (or engaged) as shown in FIGS. 10C and 10D, transfer pins 646 are pushed outwardly by retaining portion 652 of the plunge pin 620. In embodiments in which first retaining device 644 is an internal retaining device, the natural or uncompressed state of the retaining device is expanded to the outer radius to prevent axial movement of the coupling shaft 562 relative to the drive system. To disengage and remove coupling shaft 562, in addition to compressing plunge pin 620, axial force is applied to coupling shaft 562 (more generally, to CV joint 558) such that shoulder 649 acts to compress the first retaining device 644 radially inward, which is allowed due to the movement of transfer pins 646 radially inward as a result of plunge pin 620 being compressed. In some embodiments, a ramp geometry of shoulder 649 allows axial force applied to coupling shaft 562 to cause first retaining device 644 to be compressed radially inward. In embodiments in which first retaining device 644 is an external retaining device, the natural or uncompressed state of the retaining device is contracted to the inner radius (to fit within groove 645 (shown in FIG. 12)). In the operational state—in which plunge pin 620 is uncompressed—transfer pins 646 act to spring first retaining device 644 outward, which engages the shoulder 649 of internal splines 556 and prevents axial movement of the coupling shaft 562 (and therefore inner CV joint 558) relative to the drive system. When plunge pin 620 is compressed, transfer pins 646 are biased inward by first retaining device 644 as it returns to a natural or uncompressed state, in which first retaining device 644 fits within a groove 645 (shown in FIG. 12, for example) until retaining device 644 is no longer restrained axially by shoulder 649. This allows coupling shaft 562 to be removed in an axially direction from the internal spline 556 of transaxle 90. In the embodiment shown in FIG. 10D, the geometry of neck portion 653 defines a recess in plunge pin 620 having a ramp profile that allows transfer pins 646 to slide radially inward in response to axial movement of the plunge pin 620. The ramp profile of neck portion 653 also allows for plunge pin 620 to be positioned in the uncompressed or operational state by allowing transfer pins 646 to slide along the ramp as they move radially outward.

Referring now to FIGS. 11A-11E, rear half-shaft 550 is illustrated that includes inner CV joint 558 and outer CV joint 560. Although reference is made to the coupling of rear half-shaft 550 to transaxle 90, the description can also apply to the coupling of front half-shaft 82 to front differential 98 as shown in FIG. 8. In both examples, these components comprise a driven system which would in turn be connected to a drive system (e.g., front differential, rear transaxle, rear differential, etc.). Inner CV joint 558 connects coupling shaft 562 to driven shaft 564, wherein coupling shaft 562 connects driven shaft 564 to a drive system such as the transaxle. Outer CV joint 560 couples driven shaft 564 to coupling shaft 566, which in turn is coupled to a driven system such as wheel hub 568. A tool 614 is utilized to actuate a plunge pin assembly that includes plunge pin 620, allowing the driven system—including coupling shaft 562 and inner CV joint 558—to be removed from the drive system (e.g., transaxle 90 shown in FIGS. 10A-10B).

Figures 11A, 11B:
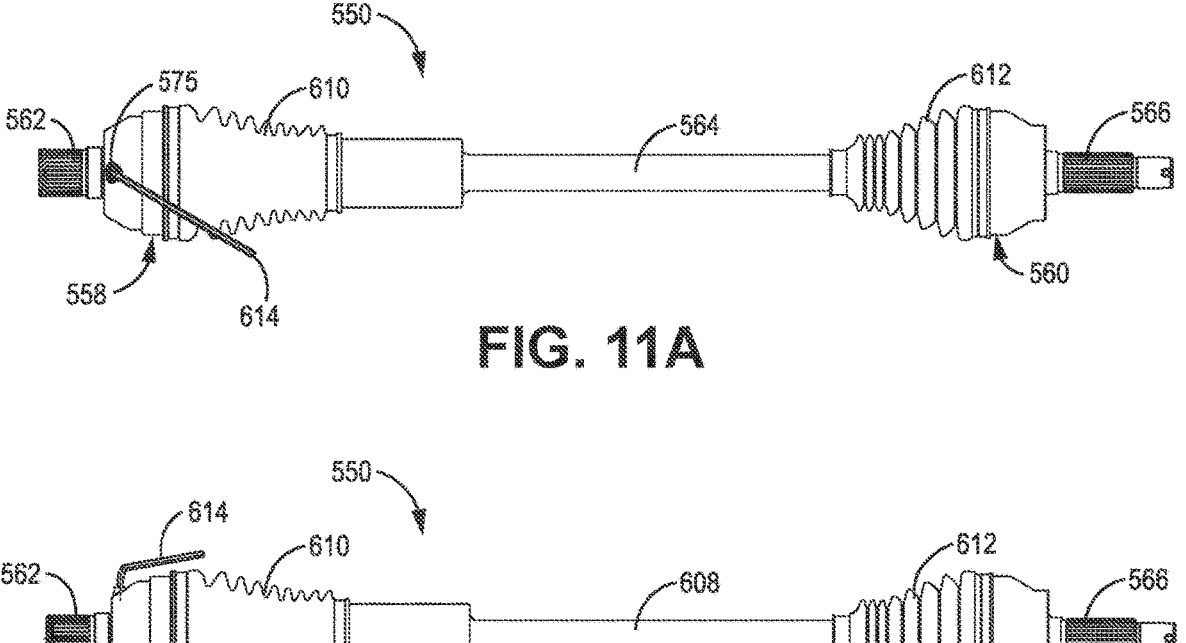
FIGS. 11A-11B are top and side views of the rear half-shaft according to some embodiments.
Figures 11C, 11D:
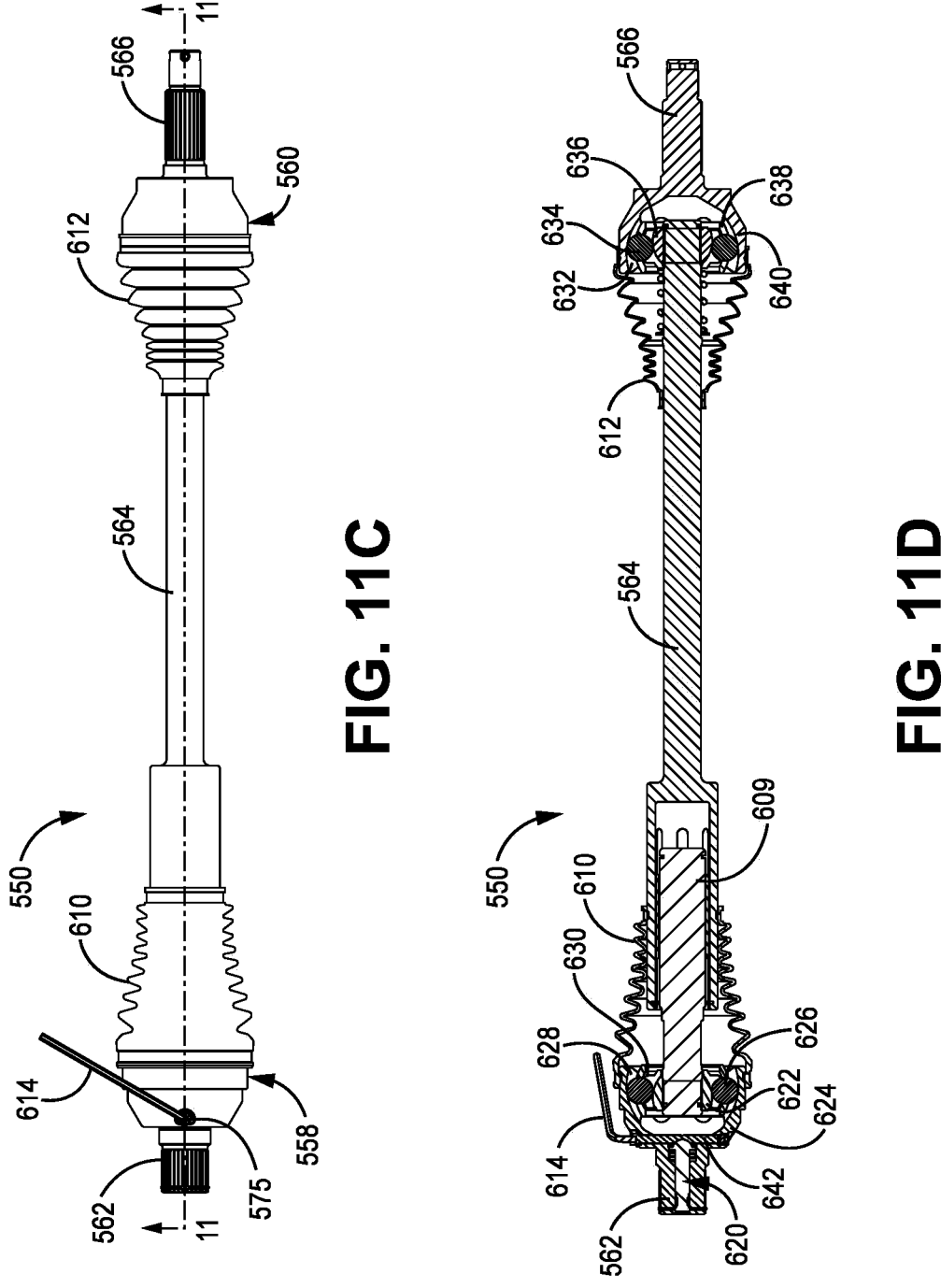
FIG. 11C is a top view of the rear half-shaft according to some embodiments.
FIG. 11D is a cross-sectional view of rear half-shaft taken along line 11-11 shown in FIG. 11C, according to some embodiments.

FIG. 11D is a cross-sectional view of rear half-shaft 550 taken along line 11-11 shown in FIG. 11C. In the embodiment shown in FIG. 11D, inner CV joint 558 includes plunge pin 620, race 622, housing 624, ball bearings 626, grooves 628, and cage 630. Outer CV joint 560 includes grooves 632, ball bearing 634, race 636, cage 638, and housing 640.

In some embodiments, coupling shaft 562 may extend from or be integrally formed with the housing 624. The coupling shaft 562 includes outer splines that engage, for example, a spool in the drive system (not shown). In some embodiments, the housing 624 includes six ball tracks or grooves 628 located on an inner surface of the housing 624. The grooves 628 allow for the ball bearings 626 to traverse with minimal friction and minimal heat generation. The ball bearings 626 are held between grooves 628 of housing 624, cage 630 and race 636. In some embodiments, the cage 630 includes a plurality of windows that are aligned with the six ball tracks or grooves 628, wherein each window acts to retain each of the six ball bearings 626. In addition, the race 636 retains the ball bearings 626 in place by aligning the legs of the race 636 with the web between the windows of cage 630. As a result, the joint allows for large angular changes between coupling shaft 562 and driven shaft 564, while maintaining a constant velocity. Similar components are utilized in the outer CV joint 560, including a housing 640 having grooves 632, ball bearings 634, cage 638 and race 636. Once again, these components allow for large angular changes between driven shaft 564 and the coupling shaft 566, while maintaining a constant velocity between the driven shaft 564 and coupling shaft 566.

In the embodiment shown in FIG. 11D, inner CV joint 558 includes a plunge pin 620 that is utilized to disengage coupling shaft 562 from the drive system. In some embodiments, actuation pin 642 (or separate tool) is utilized to actuate plunge pin 620 to allow coupling shaft 562 to disengage from the drive system. In the embodiment shown in FIG. 11D, tool 614 is utilized during the disengagement process to rotate actuation pin 642, thereby actuating plunge pin 620 and allowing for disengagement of the coupling shaft 562 from the drive system.

Figure 11E:
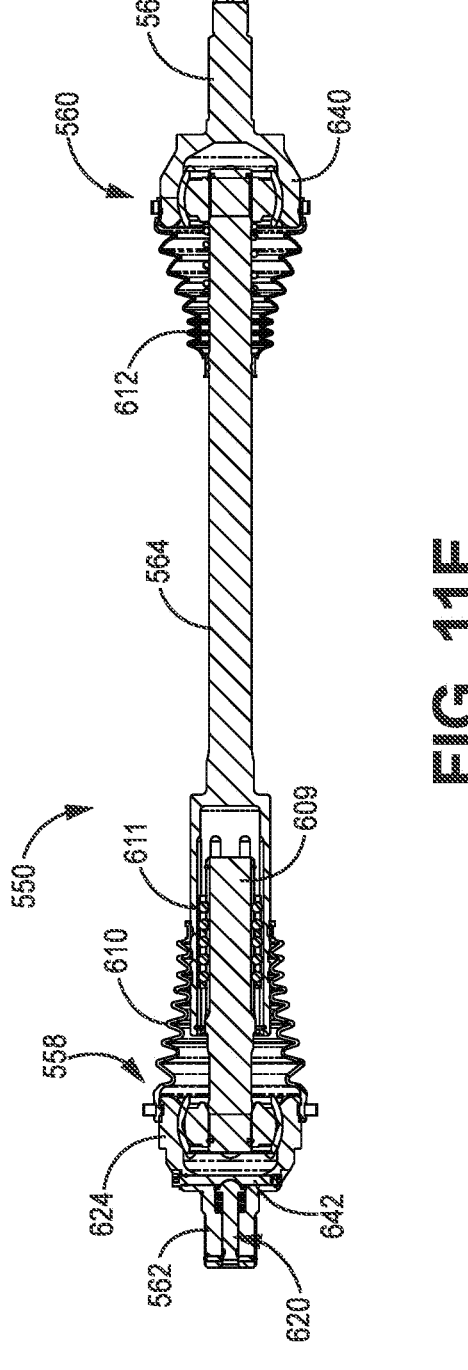
FIG. 11E is a cross-sectional view of rear half-shaft according to some embodiments.

Referring to FIG. 11E, the cross-section of inner CV joint 558 illustrates ball spline 611 utilized to couple shaft 609 to driven shaft 564. Ball spline 611 permits axial movement (axle plunge) of the inner CV joint 558 with respect to driven shaft 564.

Figure 12:
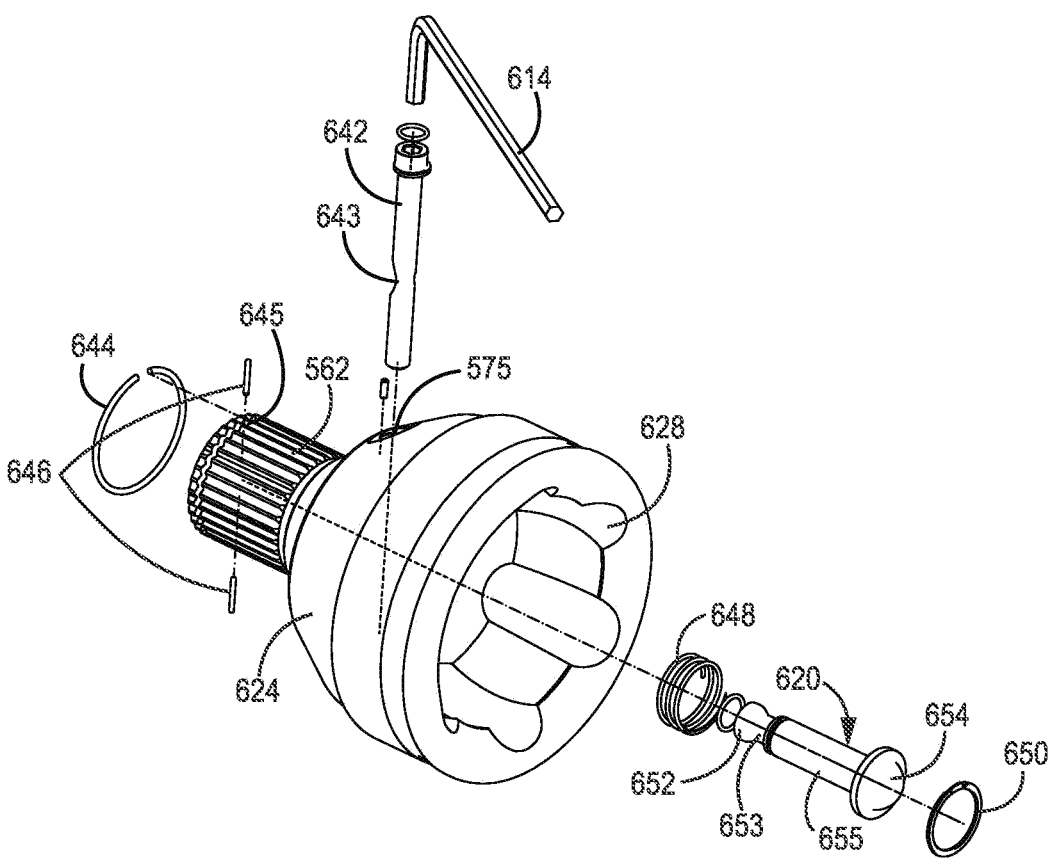
FIG. 12 is an exploded view of inner constant velocity (CV) joint according to some embodiments.

Referring to FIG. 12, an exploded view of some of the components included in the inner CV joint 558 is shown, including housing 624, plunge pin 620, and coupling shaft 562. In the embodiment shown in FIG. 12, coupling shaft 562 includes an outer splined surface that is mechanically coupled to an inner splined surface of the drive system (not shown). Engagement of the coupling shaft 562 to the drive system is maintained by detent assembly that includes first retaining device 644, groove 645, and one or more transfer pins 646. Plunge pin 620, bias spring 648 and second retaining device 650 are received within coupling shaft 562. Plunge pin 620 includes a retaining portion 652, a narrower neck portion 653, a body 655, and a contact head 654. Retaining portion 652 has an outer radius greater than neck portion 653. In some embodiments, the retaining portion 652 ramps from the outer radius to the inner radius of the neck portion 653. The ramp between the retaining portion 652 and narrower neck portion 653 allows transfer pins 646 to move radially inward and outward in response to plunge pin 620 moving axially in and out. Actuation pin 652 is received within aperture 575 and includes recessed portion 643. In some embodiments, actuation pin 652 is generally cylindrical, with recessed portion 643 having a geometry selected to interface with contact head 654 of plunge pin 620, as shown in FIG. 13D.

In some embodiments, the biasing member 648 may take the form of a wave spring or coil spring. Likewise, the first retaining device 644 may take the form of a circlip, a snap ring, a coil spring, or a crest wave spring and the second retaining device 650 may take the form of a retaining ring. By way of example, the circlip, snap ring, coil spring, or crest wave spring includes a semi-flexible metal ring with open ends which can be snapped into place into groove 645 formed in the coupling shaft 562 for first retaining device 644 or similarly within a groove formed within housing for second retaining device 650. As discussed above with respect to FIGS. 10C and 10D, first retaining device 644 may be either an internal retaining device or an external retaining device. In both embodiments, the first retaining device 644 prevents lateral (i.e., axial) movement of coupling shaft 562 due to engagement of the first retaining device 644 with the shoulder 649 of internal splined surface 556 (shown in FIG. 10C and 10D) of the drive system. When plunge pin 620 is uncompressed (or engaged), transfer pins 646 are pushed outwardly by the retaining portion 652 which, in some embodiments, is located at the first end 652 of plunge pin 620. When plunge pin 620 is compressed, transfer pins 646 are biased radially inward by first retaining device 644 into the recess defined by neck portion 653 of plunge pin 620, allowing first retaining device 644 to move radially inward (either as a result of returning to a natural state or as the result of axial force applied to coupling shaft 562 and more generally to CV joint 558) into groove 645. As a result, coupling shaft 562 can be disengaged from the drive system. As described in more detail below, plunge pin 620 is actuated in an axial direction to facilitate installation or removal of coupling shaft 562 via the actuation pin 642 and the tool 614 utilized to rotate actuation pin 642. In some embodiments, tool 614 may be implemented as an L-wrench or hex key wrench. An aperture or opening 575 in housing 624 is configured to receive actuation pin 642 and to make one end (referred to herein as the proximate end) of actuation pin 642 accessible to tool 614. For example, the proximate end of actuation pin 642 may include a hexagonal geometry configured to interact with the hex key wrench to allow the Allen wrench to exert a rotational force on the actuation pin 642. As shown in FIG. 12, actuation pin 642 extends in a direction non-parallel to the direction plunge pin 620 is biased or actuated to engage/disengage the coupling shaft 562 from the drive system. In some embodiments, actuation pin 642 extends in a direction transverse or perpendicular to the direction in which plunge pin 620 is biased or actuated to engage/disengage the coupling shaft 562 from the drive system.

Figure 13A:
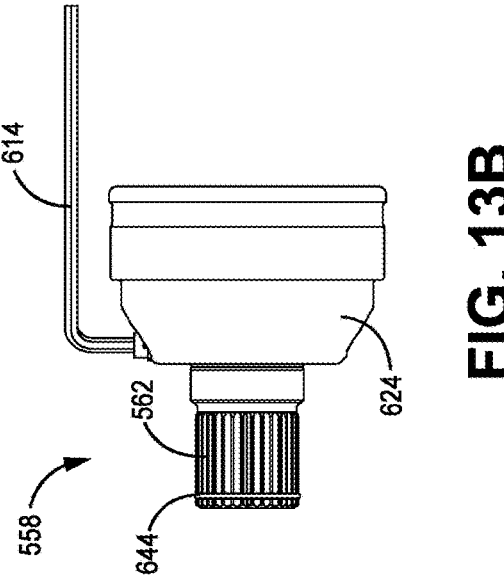
FIGS. 13A-13C are top, side, and end views of the CV joint in an uncompressed or operational state according to some embodiments.
Figure 13B:
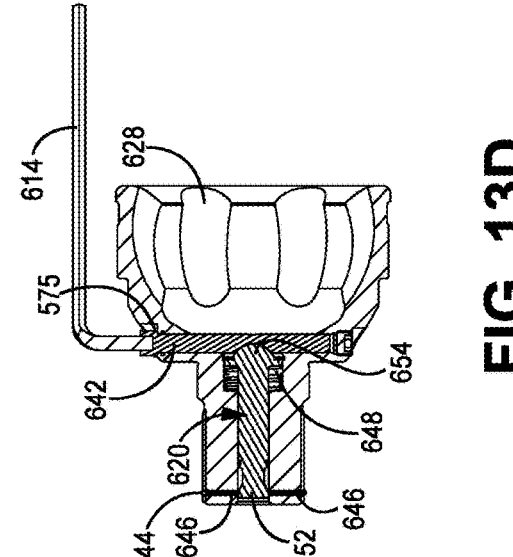
Figure 13C:
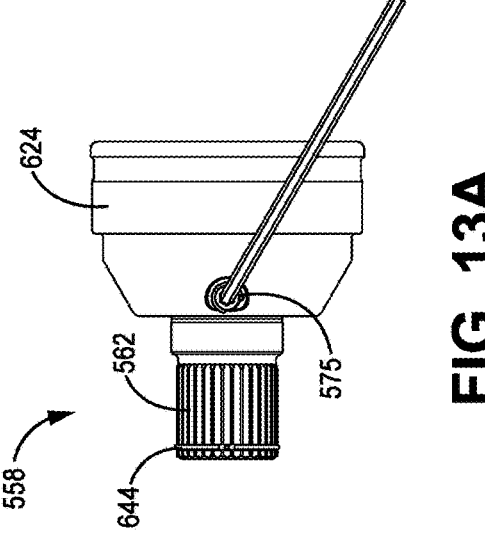
Figure 13D:
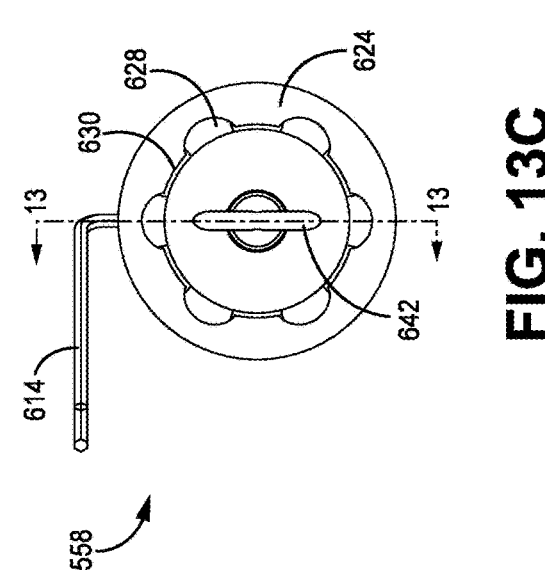
FIG. 13D is a cross-sectional view of CV joint taken along line 13-13 shown in FIG. 13C according to some embodiments.
Figure 14A:
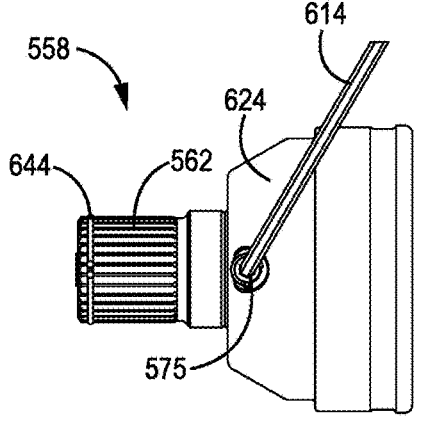
FIGS. 14A-14C are top, side, and end views of the CV joint in a compressed or non-operational state according to some embodiments.
Figure 14B:
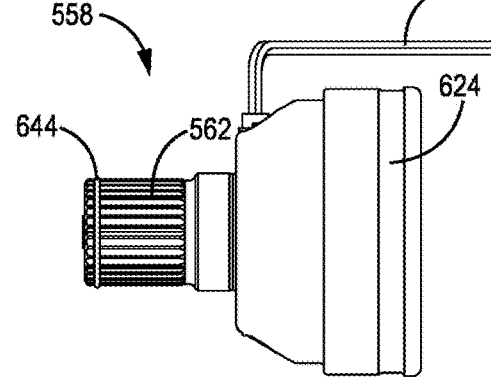
Figure 14C:
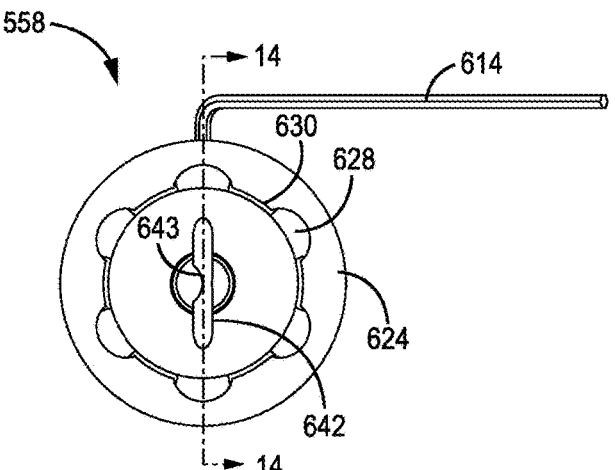
Figure 14D:
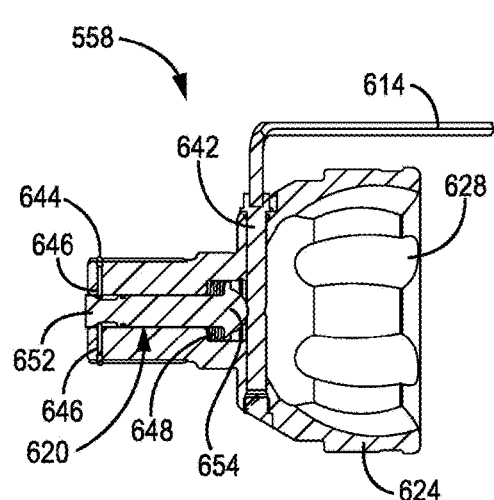
FIG. 14D is a cross-sectional view of CV joint taken along line 14-14 shown in FIG. 14C according to some embodiments.
Figure 15:
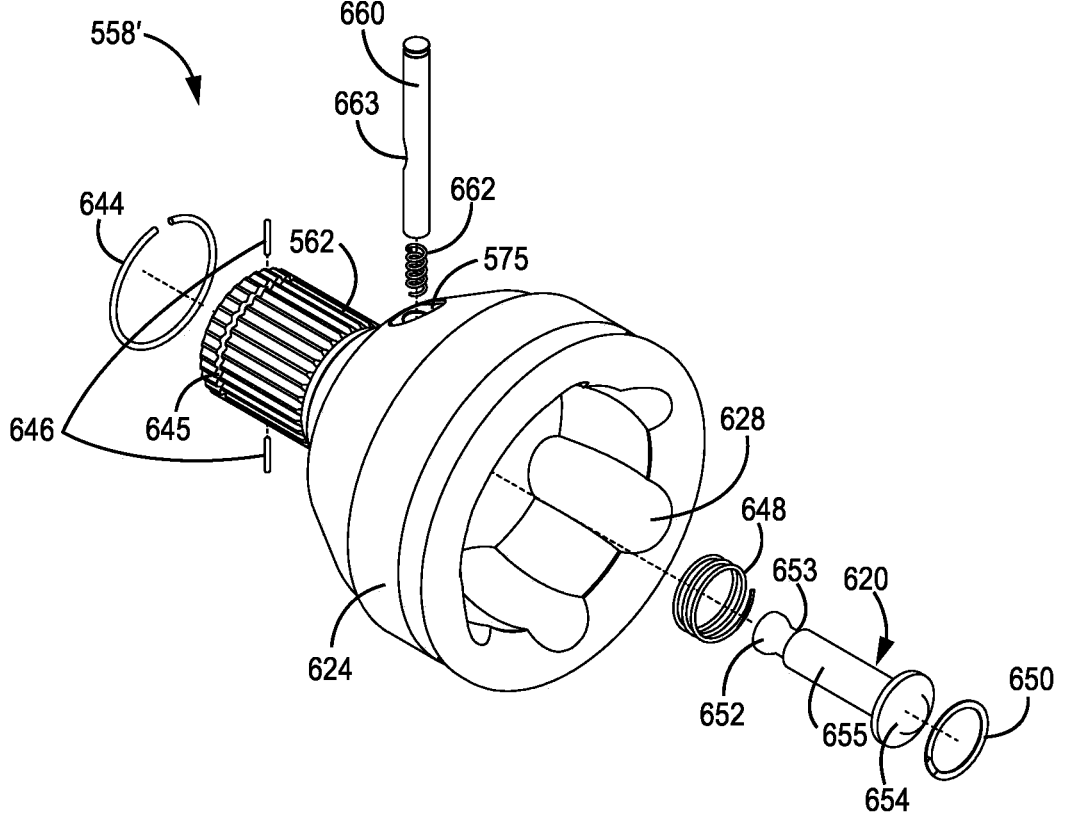
FIG. 15 is an exploded view of inner constant velocity (CV) joint according to some embodiments.

FIGS. 13A and 13B illustrate a top view of the inner CV joint 558 and a side view of the CV joint 558, respectively. FIG. 13C illustrates an end view of CV joint 558 and FIG. 13D illustrates a cross-sectional view taken along line 13-13 shown in FIG. 13C in which the plunge pin 620 is uncompressed and the detent assembly that includes transfer pins 646 and first retaining device 644 is in the engaged position-maintaining engagement between coupling shaft 562 and the drive system for normal operation. Plunge pin 652 is received within coupler shaft 562. First end 652 includes a retaining and a necked down portion. Bias spring 648 acts to bias plunge pin 620 axially in a direction toward actuation pin 642. In the embodiment shown in FIG. 13D, actuation pin 642 includes a recessed portion 643 (shown in FIG. 12) that is configured to receive the contact head 654 associated with plunge pin 620. When the contact head 654 is located within the recessed portion 643 of actuation pin 642, the retaining portion 652 of plunge pin 620 remains in contact with transfer pins 646, which in turn remain in contact with first retaining device 644. In this position, first retaining device 644 extends at least partially radially outward of the shoulder portion 649 of the external splines associated with coupling shaft 562, thereby maintaining engagement of coupling shaft 562 with the drive system to which it is coupled and allowing for normal operation. It should be noted, during normal operation, tool 614 is removed from the system, only being utilized to engage or disengage CV joint 558 from the drive system.

FIGS. 14A-14D illustrate disengagement of coupling shaft 562 via actuation (i.e., compression) of plunge pin 620 by rotation of actuation pin 642. To disengage coupling shaft 562 from the drive system, actuation pin 642 is rotated (e.g., by tool 614, utilized only during this operation) such that the recessed portion 643 of actuation pin 642 is rotated away from contact head 654 of plunge pin 620. The larger diameter portion of actuation pin 642 engages contact head 654, and causes plunge pin 620 to be biased in an axial direction. The actuation of plunge pin 620 compresses bias spring 648 and causes transfer pins 646 to fall within the recess defined by neck portion 653 of plunge pin 620. As the transfer pins 646 move radially inward, first retaining device 644 is allowed to move radially inward into groove 645. In this way, the detent mechanism is moved and allows the disengagement of coupling shaft 562 from the drive system by sliding coupling shaft 562 (and associated components) in an axial direction away from the drive system. In some embodiments, the recessed portion 643 included on actuation pin 642 requires actuation pin 642 to be rotated approximately 90 degrees.

Referring now to FIGS. 15, 16A-16C and 17A-17C, CV joint assembly 558' utilizes the same or similar components to those described with respect to FIGS. 12, 13A-13D and 14A-14D and the same reference numerals are utilized for the same or similar components. In some embodiments, rather than actuation of the detent assembly via rotation of the actuation pin 642 using a tool 614, the detent assembly is actuated via linear force applied to actuation pin 660. In this embodiment, actuation pin 660 once again includes a recessed portion 663 configured to engage with the contact head 654 of plunge pin 620. Bias spring 662 is seated within the chamber that retains actuation pin 660 and acts to bias the actuation pin 660 to maintain the contact head 654 of plunge pin 620 in contact with the recessed portion 663 of actuation pin 660. In this embodiment, actuation pin 660 extends in a direction non-parallel to the direction plunge pin 620 is biased or actuated to engage/disengage the coupling shaft 562 from the drive system. In some embodiments, actuation pin 660 extends in a direction transverse or perpendicular to the direction in which plunge pin 620 is biased or actuated to engage/disengage the coupling shaft 562 from the drive system.

Figures 16A, 16B, 16C, 17A, 17B, 17C:
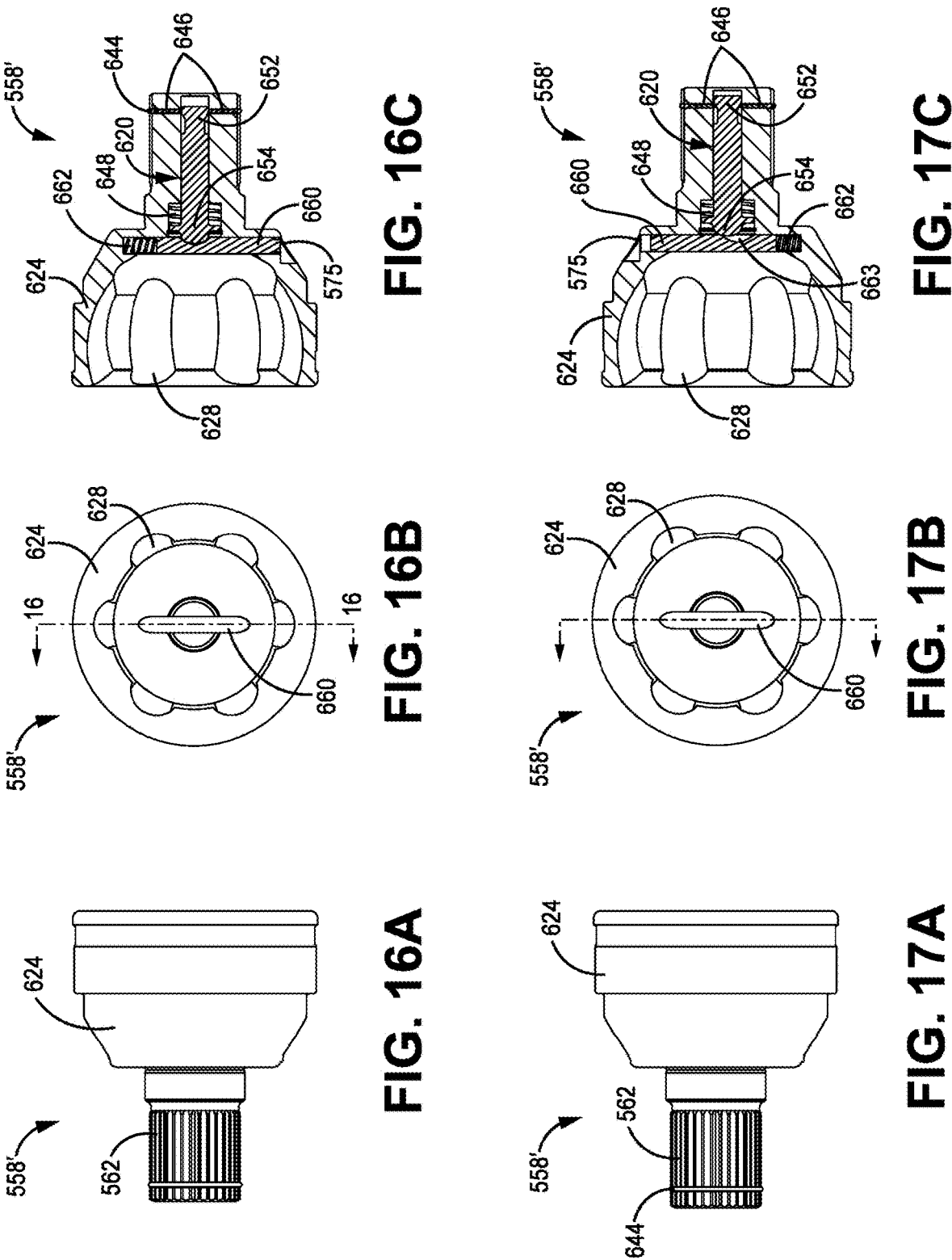
FIGS. 16A-16B are side and end views of the CV joint in an uncompressed or operational state according to some embodiments.
FIG. 16C is a cross-sectional view of CV joint taken along line 16-16 shown in FIG. 16B according to some embodiments.
FIGS. 17A-17B are side and end views of the CV joint in a compressed or non-operational state according to some embodiments.
FIG. 17C is a cross-sectional view of CV joint taken along line 17-17 shown in FIG. 17B according to some embodiments.
Figure 18:
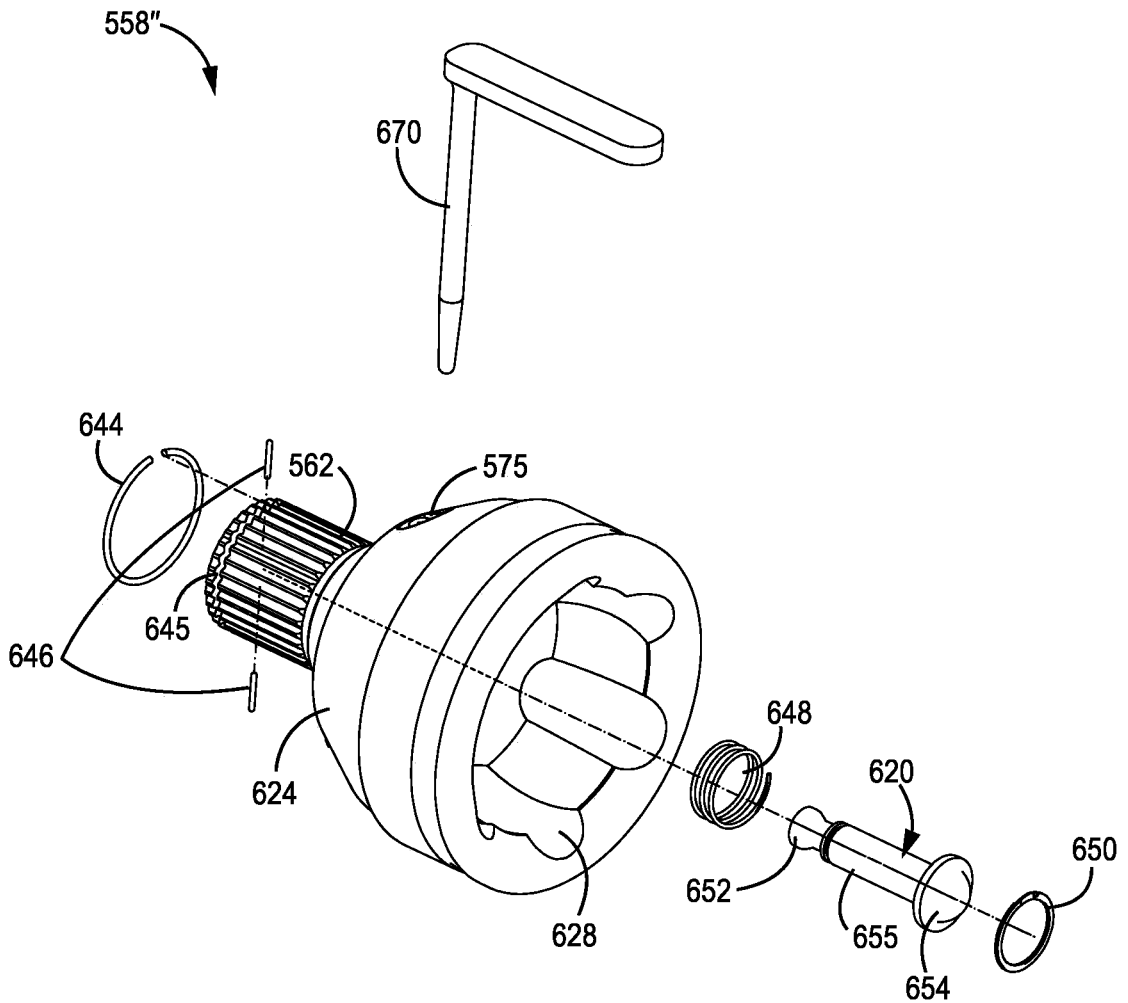
FIG. 18 is an exploded view of inner constant velocity (CV) joint according to some embodiments.
Figures 19A, 19B, 19C, 19D, 20A, 20B, 20C, 20D:
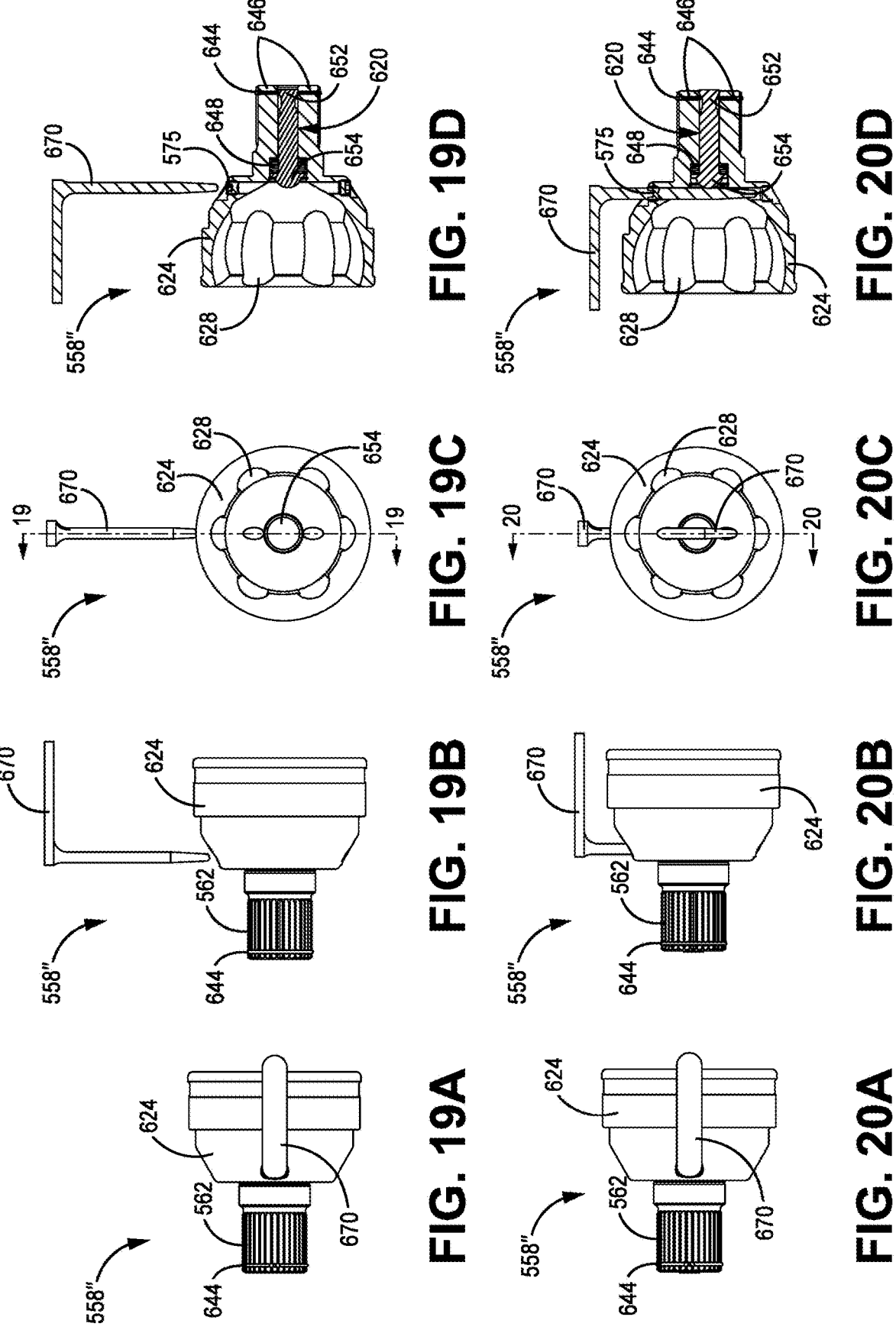
FIGS. 19A-19C are top, side and end views of the CV joint in an uncompressed or operational state according to some embodiments.
FIG. 19D is a cross-sectional view of CV joint taken along line 19-19 shown in FIG. 19C according to some embodiments.
FIGS. 20A-20C are top, side, and end views of the CV joint in a compressed or non-operational state according to some embodiments.
FIG. 20D is a cross-sectional view of CV joint taken along line 20-20 shown in FIG. 20C according to some embodiments.

FIGS. 16A-16C illustrates the CV joint 558' in an engaged or "uncompressed" state for operation. In this state, plunge pin 620 and bias spring 648 are uncompressed and the detent assembly that includes transfer pins 646 and first retaining device 644 is in the engaged position-maintaining engagement between coupling shaft 562 and the drive system. In the embodiment shown in FIG. 16C, actuation pin 660 includes a recessed portion 663 that is configured to receive the contact head 654 associated with plunge pin 620. When the contact head 654 is located within the recessed portion 663 of actuation pin 660, the retaining portion 652 of plunge pin 620 remains in contact with transfer pins 646, which in turn remain in contact with first retaining device 644. In this position, first retaining device 644 extends at least partially radially outward of external splines associated with coupling shaft 562, thereby maintaining engagement of coupling shaft 562 with the drive system to which it is coupled. In this state, bias spring 662 is uncompressed. Actuation pin 660 may be retained within the housing 624 by a cap (not shown) placed over the aperture 575 in housing 624 configured to receive actuation pin 660. In other embodiments, a retaining ring or similar mechanism is utilized to ensure that actuation pin 642 remains in contact with plunge pin 620. In still other embodiments, the lack of force applied by bias spring 662 combined with the capture of contact head within the recessed portion 663 of actuation pin 660 maintains actuation pin 660 within housing 624.

FIGS. 17A-17C illustrate disengagement of coupling shaft 562 via actuation (i.e., compression) of plunge pin 620 by applying a linear force to actuation pin 660, thereby compressing bias spring 662 and displacing the recessed portion 663 of actuation pin 660 from contact with plunge pin 620. As non-recessed portions of actuation pin 660 contact plunge pin 620, the plunge pin 620 is actuated axially and bias spring 648 is compressed, which results in transfer pins 646 moving into the recess defined by neck portion 653 of plunge pin 620. As the pins 646 move radially inward, first retaining device 644 either returns to a natural (uncompressed state) within groove 645 (e.g., external retaining ring) or is compressed into groove 645 via application of axial force to coupling shaft 562 (e.g., internal retaining ring). In this way, the detent mechanism is moved and allows the disengagement of coupling shaft 562 from the drive system by sliding coupling shaft 562 (and associated components) in an axial direction away from the drive system. In some embodiments, actuation pin 660 must maintain bias spring 662 in a compressed state to disengage the coupling shaft 562 from the drive system. In some embodiments, actuation pin 660 can be actuated radially inward (as described here) only. In other embodiments, actuation pin 660 can be actuated radially inward and then rotated to capture the actuation pin 660 in a compressed state to allow disengagement of coupling shaft 562 without having to maintain force on actuation pin 660 in a radially inward direction during disengagement. In other embodiments, actuation pin can be actuated radially inward and then rotated such that the recessed portion 663 in actuation pin 660 is no longer aligned with the contact head 654 of plunge pin 620, such that even if actuation pin 660 is allowed to return to an uncompressed state the plunge pin 620 remains in a compressed state to allow for disengagement of the coupling shaft 562.

Referring now to FIGS. 18, 19A-19C and 20A-20C, CV joint assembly 558" utilizes the same or similar components to those described with respect to FIGS. 11, 12A-12D, 14A-14D, 15, 16A-16C and 17A-17A and the same reference numerals are utilized for the same or similar components. In some embodiments, rather than actuation of the detent assembly via an actuation pin permanently housed within the housing 624, a tool 670 is utilized in place of the actuation pin when necessary to disengage or remove the driven system from the drive system. For example, in the embodiment shown in FIG. 18, tool 670 is only inserted within housing 624 when it is required to remove or install coupling shaft 562 from the drive system. Otherwise, a cap or insert (not shown) may be utilized to cover the aperture 575 in housing 624 to prevent foreign debris or particles from entering the interior of housing 624. In this embodiment, tool 670 has a diameter that allows it to be placed within the aperture 575 in housing 624 and may have a tip geometry that allows the tool 670 to engage with the contact head 654 of plunge pin 620. However, because tool 670 is not maintained within housing 624 during normal operation, tool 670 does not require a recessed portion for receiving the contact head of plunge pin 620. In some embodiments, the interior of housing 624 may include a guide that simplifies insertion of the tool 670 to make and maintain contact between tool 670 and the contact head of plunge pin 620. In some embodiments, tool 670 is inserted in a direction non-parallel to the direction plunge pin 620 is biased or actuated to engage/disengage the coupling shaft 562 from the drive system. In some embodiments, tool 670 is inserted in a direction transverse or perpendicular to the direction in which plunge pin 620 is biased or actuated to engage/disengage the coupling shaft 562 from the drive system.

FIGS. 19A-19D illustrates the CV joint assembly 558" in an engaged or "uncompressed" state for operation. In this state, plunge pin 620 and bias spring 648 are uncompressed and the detent assembly that includes transfer pints 646 and first retaining device 644 is in the engaged position-maintaining engagement between coupling shaft 562 and the drive system. In contrast with previous embodiments, no actuation pin is present during normal operation in which plunge pin 620 and bias spring 648 are uncompressed. In some embodiments, plunge pin 620 is retained within housing by second retainer device 650. In this position, first retainer device 644 extends at least partially radially outward of external splines provided on coupling shaft 562 to engage with the internal splines 556 associated with the drive system, thereby maintaining engagement of coupling shaft 562 with the drive system to which it is coupled. In this state, bias spring 662 is uncompressed. During operation tool 670 may be removed entirely from housing 624 as shown in FIGS. 19A-19D and a cap or insert may be placed in aperture or opening 575 to prevent debris or foreign particles from entering the cavity of housing 624.

FIGS. 20A-20D illustrate disengagement of coupling shaft 562 via actuation (i.e., compression) of plunge pin 620 by inserting tool 670 through an aperture on housing 624, wherein tool 670 comes into contact with the contact head 654 of plunge pin 620, actuating plunge pin 620 such that bias spring 648 is compressed, which results in transfer pins 646 being moved radially inward into the recess defined by neck portion 653 of plunge pin 620. As the pins 646 move radially inward, first retaining device 644 is allowed to move radially inward into groove 645. In this way, the detent mechanism is moved and allows the disengagement of coupling shaft 562 from the drive system by sliding coupling shaft 562 (and associated components) in an axial direction away from the drive system. To reinstall coupling shaft 562, tool 670 maintains plunge pin 620 and bias spring 648 in a compressed state.

Referring now to FIGS. 21A-24, an embodiment is illustrated in which actuation pin 670' actuates plunge pin 620' by rotating the plunge pin. FIG. 21A-21B are end views of the CV joint 558''' in an operational state and a non-operational state according to some embodiments. In particular, FIG. 21A illustrates CV joint 558''' in an operational state in which CV joint 558''' is coupled to the drive system. FIG. 21B illustrates CV joint 558''' in a non-operational or disengaged state in which CV joint 558''' is disengaged or decoupled from the drive system.

In the embodiment shown in FIGS. 21A-21B, to disengage or decouple CV joint 558''' from the drive system actuation tool 670' is inserted through housing 624 and placed into contact with the contact head portion of the plunge pin 620'. In this embodiment, actuation tool 670' is offset slightly from the centerline of plunge pin 620', such that actuation tool 670' contacts plunge pin 620' toward the outer radius of the contact head, which includes a raised portion 700 that is contacted by actuation tool 670'. In this embodiment, actuation tool 670' is actuated in a direction that is non-parallel with the centerline of plunge pin 620'. As actuation tool 670' is actuated in a radial inward direction, actuation tool 670' contacts raised portion 700 and causes plunge pin 620' to rotate about its centerline, as shown in FIG. 21B. As described in more detail with respect to FIGS. 23 and 24, rotation of plunge pin 620' results in disengagement of CV joint 558''' from the drive system.

Figure 22:
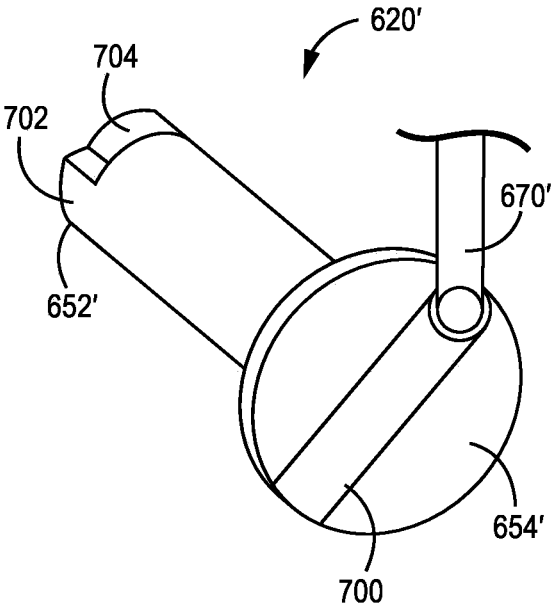
FIG. 22 is a perspective view of a plunge pin according to some embodiments.
Figure 23:
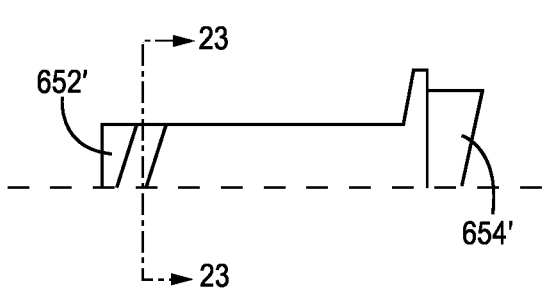
FIG. 23 is a side view of the plunge pin shown in FIG. 22 according to some embodiments.
Figure 24:
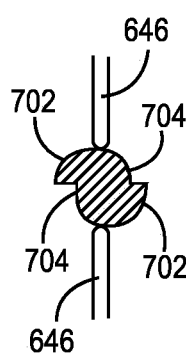
FIG. 24 is a cross-sectional view of the plunge pin taken along line 23-23 shown in FIG. 23 according to some embodiments.

Referring now to FIGS. 22-24, the operation of FIG. 22 is a perspective view of a plunge pin according to some embodiments. In the embodiment shown in FIG. 22, plunge pin includes first end 652' and second end 654' includes a contact head portion having a flange and a raised portion 700 for interacting with actuation tool 670'. First end 652' includes a maximum radius portion 702 and a minimum radius portion 704. FIG. 24 is a cross-sectional view of the first end 652' of plunge pin 620' taken along line 23-23. As shown in FIG. 24, the first end includes a maximum radius portion 702 and a minimum radius portion 704. When plunge pin 620' is in the operational or engaged state, transfer pins 646 (shown in FIG. 24) maintain contact with the maximum radius portion 702 of plunge pin 620'. When plunge pin 620' is in the non-operational state—wherein it has been rotated via actuation of actuation tool 670'—transfer pins are aligned with the minimum radius portion 704 of plunge pin 620' and therefore move radially inward, allowing the CV joint 558''' to be disengaged from the drive system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. An off-road vehicle comprising:
   a frame;
   a passenger compartment;
   a driveline that includes at least a drive system and a driven system; and
   a joint coupled to the drive system and the driven system, wherein the joint comprises:
   a housing having a first end for engaging a driven shaft and a second end opposite the first end;
   a coupling shaft located at the second end of the housing, the coupling shaft configured for engagement with the drive system;
   a detent extending to an outer periphery of the coupling shaft;
   a plunge pin disposed at least partially within the coupling shaft and having a first end engaged with one or more transfer pins and a second end located opposite the first end, the plunge pin being movable axially between a first position that maintains the detent in an engaged position with the drive system and a second position that permits disengagement of the detent with the drive system;
   a spring positioned closer to the second end of the plunge pin than to the first end, wherein the spring biases the plunge pin; and
   an actuation device located at least partially within the housing and configured to interact with the plunge pin to actuate the plunge pin between the first position and the second position.

2. The off-road vehicle of claim 1, wherein the actuation device has a first end that is accessible via an aperture in the housing.

3. The off-road vehicle of claim 2, wherein the actuation device is oriented in a direction non-parallel to the plunge pin and movable between a first position and a second position to change the position of the plunge pin.

4. The off-road vehicle of claim 3, wherein the actuation device has a length extending from the first end to a second end, wherein the length of the actuation device is oriented in a direction perpendicular to the plunge pin, and wherein the actuation device is movable along its length between the first position and the second position.

5. The off-road vehicle of claim 3, wherein at least the first end of the actuation device moves inward away from the aperture when the actuation device moves from the first position to the second position.

6. The off-road vehicle of claim 3, wherein actuation of the actuation device from the first position to the second position moves the plunge pin from the first position to the second position.

7. The off-road vehicle of claim 3, wherein the actuation device is moved between the first position and the second position via a tool that interacts with the first end of the actuation device.

8. The off-road vehicle of claim 3, wherein the actuation device moves between the first position and the second position via rotation of the actuation device.

9. The off-road vehicle of claim 3, wherein the actuation device is in contact with the plunge pin when the plunge pin is in the first position.

10. The off-road vehicle of claim 1, wherein the actuation device is positioned closer to the second end of the plunge pin than to the first end of the plunge pin.

11. The off-road vehicle of claim 1, further including a retaining device for retaining the plunge pin within the housing.

12. A constant velocity joint comprising:
    a housing having a first end for engaging a driven shaft and a second end opposite the first end;

a coupling shaft located at the second end of the housing, the coupling shaft configured for engagement with the drive system;

a detent extending to an outer periphery of the coupling shaft;

a plunge pin disposed at least partially within the coupling shaft and having a first end engaged with one or more transfer pins and a second end located opposite the first end, the plunge pin being movable axially between a first position that maintains the detent in an engaged position with the drive system and a second position that permits disengagement of the detent with the drive system;

a spring positioned closer to the second end of the plunge pin than to the first end, wherein the spring biases the plunge pin; and an actuation device located at least partially within the housing and configured to interact with the plunge pin to actuate the plunge pin between the first position and the second position.

13. The off-road vehicle of claim 12, wherein the actuation device has a first end that is accessible via an aperture in the housing.

14. The off-road vehicle of claim 13, wherein the actuation device is oriented in a direction non-parallel to the plunge pin and movable between a first position and a second position to change the position of the plunge pin.

15. The off-road vehicle of claim 14, wherein the actuation device has a length extending from the first end to a second end, wherein the length of the actuation device is oriented in a direction perpendicular to the plunge pin, and wherein the actuation device is movable along its length between the first position and the second position.

16. The off-road vehicle of claim 14, wherein at least the first end of the actuation device moves inward away from the aperture when the actuation device moves from the first position to the second position.

17. The off-road vehicle of claim 14, wherein actuation of the actuation device from the first position to the second position moves the plunge pin from the first position to the second position.

18. The off-road vehicle of claim 14, wherein the actuation device is moved between the first position and the second position via a tool that interacts with the first end of the actuation device.

19. The off-road vehicle of claim 14, wherein the actuation device moves between the first position and the second position via rotation of the actuation device.

20. The off-road vehicle of claim 12, wherein the actuation device is positioned closer to the second end of the plunge pin than to the first end of the plunge pin.

* * * * *